(12) United States Patent
Luqman et al.

(10) Patent No.: US 9,014,481 B1
(45) Date of Patent: Apr. 21, 2015

(54) METHOD AND APPARATUS FOR ARABIC AND FARSI FONT RECOGNITION

(71) Applicants: King Fahd University of Petroleum and Minerals, Dhahran (SA); King Abdulaziz City for Science and Technology, Riyadh (SA)

(72) Inventors: Hamzah Abdullah Luqman, Dhahran (SA); Sabri Abdullah Mohammed, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 0 days.

(21) Appl. No.: 14/258,650

(22) Filed: Apr. 22, 2014

(51) Int. Cl.
G06K 9/48 (2006.01)
G06K 9/18 (2006.01)

(52) U.S. Cl.
CPC . G06K 9/18 (2013.01); G06K 9/481 (2013.01)

(58) Field of Classification Search
USPC .......................................... 382/182, 185, 190
See application file for complete search history.

(56) References Cited

U.S. PATENT DOCUMENTS 6,272,238 B1 * 8/2001 Kugai ............................ 382/165
8,150,160 B2 * 4/2012 Al-Muhtaseb et al. ........ 382/185
2006/0062460 A1 * 3/2006 Jun et al. ........................ 382/182
2014/0104175 A1 * 4/2014 Ouyang et al. ................ 345/168
2014/0140622 A1 * 5/2014 Chattopadhyay et al. .... 382/182

FOREIGN PATENT DOCUMENTS

CN 1128423 C 11/2003
WO WO 2008/138356 A2 11/2008

OTHER PUBLICATIONS

Huanfeng Ma, et al., "Gabor Filter Based Multi-class Classifier for Scanned Document Images", Proceeding of the Seventh International Conference on Document Analysis and Recognition, 2003, (5 pages).
Fouad Slimane, et al., "A study on font-family and font-size recognition applied to Arabic word images at ultra-low resolution", Pattern Recognition Letters, 2013 (10 pages).

* cited by examiner

*Primary Examiner* — Gregory M Desire
(74) *Attorney, Agent, or Firm* — Oblon, McClelland, Maier & Neustadt, L.L.P.

(57) ABSTRACT

A method for Arabic and Farsi font recognition for determining the font of text using a nearest neighbor classifier, where the classifier uses a combination of features including: box counting dimension, center of gravity, the number of vertical and horizontal extrema, the number of black and white components, the smallest black component, the Log baseline position, concave curvature features, convex curvature features, direction and direction length features, Log-Gabor features, and segmented Log-Gabor features. The method is tested using various combination of features on various text fonts, sizes, and styles. It is observed the segmented Log-Gabor features produce a 99.85% font recognition rate, and the combination of all non-Log-Gabor features produces a 97.96% font recognition rate.

15 Claims, 28 Drawing Sheets

Figure 3
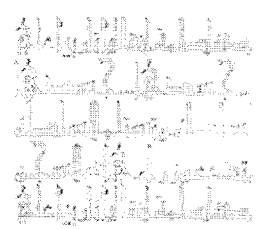
(a)　　　　　(b)　　　　　(c)　　　　　(d)

Figure 5

| (x-1, y-1) | (x, y-1) | (x+1, y-1) |
|---|---|---|
| (x-1, y) | S(x, y) | (x+1, y) |
| (x-1, y+1) | (x, y+1) | (x+1, y+1) |

(a)

|   | 1 | 2 | 3 |
|---|---|---|---|
| 1 | 135° | 90° | 45° |
| 2 | 180° | Scoped pixel | 0° |
| 3 | 225° | 270° | 315° |

| Advertising Bold | بالآخرين |
| --- | --- |
| Arabic Transparent | بالآخرين |
| Diwani Letter | بالآخرين |
| Deco Type Thuluth | بالآخرين |
| Tahoma | بالآخرين |
| Traditional Arabic | بالآخرين |
| M Unicode Sara | بالآخرين |
| Simplified Arabic | بالآخرين |
| Deco Type Naskh | بالآخرين |
| Andalus | بالآخرين |

Figure 8

| Buryidah | وفي هذا القسم تم سؤال الوزير التمام الذي سمعته الرؤية العربية لكل محور من محاور خطة عمل جنيف, والذي يدعم السعود لتحوله من الدول العربية للأساس فما تمل إليه من نتائج وإجراءات تم مشروعات تنفيذية في هذا المجال |
| --- | --- |
| Dammam | ولما تم صياغة رؤى للشيدية محددة للمنطقة العربية لتكميل خطة جنيف ضمن بلدنا وبتعا ومتعجنا وذلك من خلال طرح إجراءات للشيدية ومشروعات محددة على تناولة قمة تونس. والتي تصب نحو دعم وتطوير مجتمع المعلومات في المنطقة العربية من وجهة النظر الإقليمية. وفتح النقاش حول كيفية مساهمة المجتمع الدولي في تقيد هذه المشروعات. مع استخدام هذه الوثيقة لخلق حلول لمواجهة المعوقات التي واجهت لتقيد الالتزامات التي خلفتها خطة عمل جنيف وإعلان المبادئ |
| Diwani Letter | لقد بدأ إستخدام الحاسب الآلي في معالجة نصوص اللغة الطبيعية لأغراض التكشيف الآلي في العقد السابع من القرن العشرين وذلك لأن النظم التقليدية عاجزة عن ملاحقة هذا الطوفان من الإنتاج الفكري الهائل في الحجم والبالغ في التعقيد. ولذلك كان لابد من الإستفادة من الإمكانيات الهائلة التي تقدمها الآلة |
| Alhada | لقد بدأ استخدام الحاسب الآلي في معالجة نصوص اللغة الطبيعية لأغراض التكشيف الآلي في العقد السابع من القرن العشرين وذلك إن النظم التقليدية عاجزة عن ملاحقة هذا الطوفان من الإنتاج الفكري الهائل في الحجم والبالغ في التعقيد. ولذلك كان لابد من الإستفادة من الإمكانيات الهائلة التي تقدمها الآلة |
| Badr | وفي هذا القسم يتم تناول التوجه العام الذي تنتهجه الرؤية العربية لكل محور من محاور خطة عمل جنيف والذي يدعم |
| Koufi | لقد بدأ إستخدام الحاسب الآلي في معالجة نصوص اللغة الطبيعية لأغراض التكشيف الآلي في العقد السابع من القرن العشرين وذلك لأن النظم التقليدية عاجزة عن ملاحقة هذا الطوفان من الإنتاج الفكري الهائل في الحجم والبالغ في التعقيد. ولذلك كان لابد من الإستفادة من الإمكانيات الهائلة التي تقدمها الآلة. |
| Andalus | قبل سنوات كان الباحث عندما يطلب معلومات تتعلق بموضوع بحثه كان عليه أن يستعرض بدوياً محتويات الكثــــير من الدوريات المتعلقة بموضوعه ،وحتى غير المتعلقة بموضوعة بغية حصر كل البيانات التي قد يستفيد منها، وكان هذا مصدر للوقت والجهد. والمال في بعض الأحيان. |

Figure 8 (CONTINUED)

Ahsa

ولذا تم صياغة رؤى تنفيذية محددة للمنطقة العربية لتفعيل خطة جنيف بعض لفتها ومنهجيا وذلك من خلال طرح إجراءات تنفيذية ومشروعات محددة على طاولة قمة تونس، والتي تنصب نحو دفع وتطوير مجتمع المعلومات في المنطقة العربية من وجهة النظر الإقليمية. وفتح النقاش حول كيفية مساهمة المجتمع الدولي في تنفيذ هذه المشروعات، مع استخدام هذه الوثيقة لخلق حلول لمواجهة المعوقات التي واجهت تنفيذ الالتزامات التي خلفتها خطة عمل جنيف وإعلان المبدئ

Arabic Transparent

وفي هذا القسم يتم تناول التوجه العام الذي تنتهجه الرؤية العربية لكل محور من محاور خطة عمل جنيف والذي يدعم الجهود المبذولة من الدول العربية كأساس لما تصل إليه من نتائج وإجراءات ثم مشروعات تنفيذية في هذا المجال.

Hijaz

تتحمل حكومات الدول العربية المسئولية الأكبر في تنمية مجتمع المعلومات الإقليمي وملئ الفراغات التي ظهرت وسببت الفجوة الرقمية، وذلك من خلال آليات صنع السياسات الخاصة بها. وتتفاوت هذه

Kharj

وللتخفيف من هذا العدد ظهرت كشافات الدوريات الورقية بعضها خاص بدورية واحدة وبعضها خاص بأكثر من دورية في مجال موضوع واحد أو كشافات عامة. إلى غير ذلك من أنواع الكشافات. ومع تطور وسائل التكنولوجيا والاتصالات انترت الكشافات المحوسبة التي تتيح البيانات من خلال نظم الخط المباشر. أو عبر نظام الأقراص المدمجة . والتي أصبحت تعرض البيانات على شاشة استجابة لطلب من مستفيد. ويمكن طبعها كذلك بواسطة طابعة مجاورة إذا أراد

Khoubar

وفي هذا القسم يتم تناول التوجه العام الذي تنتهجه الرؤية العربية لكل محور خطة عمل جنيف والذي يدعم الجهود المبذولة من الدول العربية كأساس لما تصل إليه من نتائج وإجراءات ثم مشروعات تنفيذية في هذا المجال.

DecoTypeNaskh

كما لابد من التمييز بين الاعتماد على الحاسب الآلي في عملية التكشيف أو الاعتماد على حاسب كأداة مساعدة للمكشف. وأهم ما يميز تكشيف الآلي هو الاعتزاز التام بالمواضع وتعيين بواسطة الحاسب عندما يرغب قارئ، أو باحث ما في الاطلاع على معلومات ما تتعلق بموضوع ما،فإن عليه أن يجد مثل هذه المعلومات في وثيقة ما بها عنوان محدد،ورقم محدد،وتاريخ نشر محدد.

DecoTypeThoulth

Figure 18
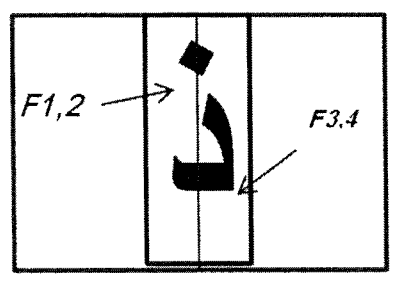
(a)
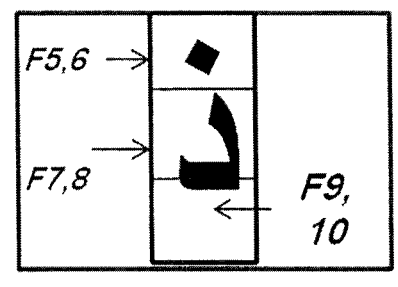
(b)

(a)            (b)

(a)  (b)

Figure 25
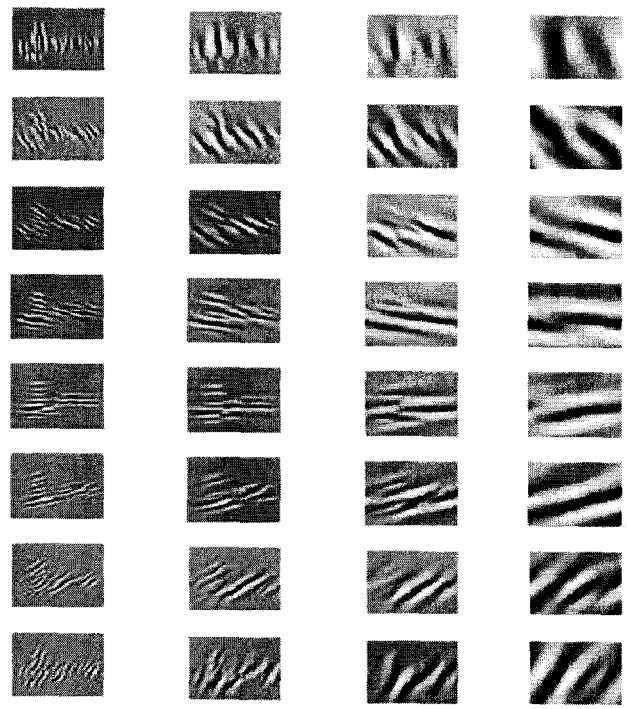
(a)
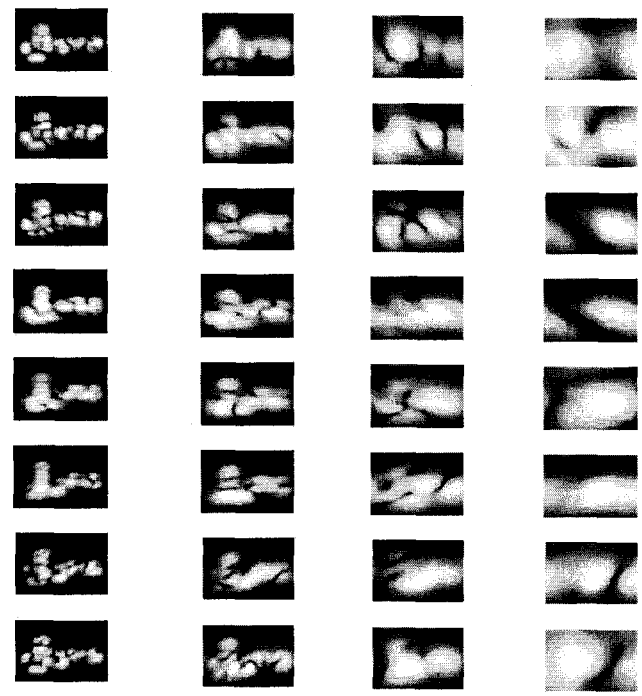
(b)

Figure 26

| Arabic Transparent | وخير جليس في الزمان كتاب |
| --- | --- |
| Times New Roman | وخير جليس في الزمان كتاب |
| Simplified Arabic | وخير جليس في الزمان كتاب |
| Arial | وخير جليس في الزمان كتاب |

METHOD AND APPARATUS FOR ARABIC AND FARSI FONT RECOGNITION

BACKGROUND OF THE INVENTION

1. Field of the Invention

A method of font recognition that includes recognizing Arabic and Farsi fonts using a nearest neighbor classifier, and a computer-implemented method and system using the same.

2. Background

Over the last years, considerable improvement has been achieved in the area of Arabic text recognition, whereas optical font recognition (OFR) for Arabic texts has not been studied as extensively as OCR despite of its importance in improving the recognition accuracy. See Amor, N. B., & Amara, N. E. B, "A hybrid approach for Multifont Arabic Characters Recognition," In Proceedings of the 5th WSEAS International Conference on Artificial Intelligence, Knowledge Engineering and Data Bases, vol. 2006, pp. 194-198, 2006; F. Slimane, S. Kanoun, H. El Abed, A. M. Alimi, R. Ingold, and J. Hennebert, "ICDAR 2011-Arabic Recognition Competition: Multi-font Multi-size Digitally Represented Text," 2011 International Conference on Document Analysis and Recognition, pp. 1449-1453, September 2011; and M. Zahedi and S. Eslami, "Farsi/Arabic optical font recognition using SIFT features," Procedia Computer Science, vol. 3, pp. 1055-1059, January 2011, each incorporated herein by reference in its entirety.

Optical Font Recognition (OFR) is the process of recognizing the font of a given text image. Identifying the font style involves determining the font typeface, size, weight, and slant of the printed text. Font recognition is useful to improve the text recognition phase in terms of recognition accuracy and time. Recognizing the font before using OCR helps in using mono-font recognition system that results in better recognition rates (compared with omni-font) and less recognition time. In addition, recognizing the text font enables the system to produce not only the text but also the font and style and the examined document, resulting in more savings in time compared to manual human editing where the writer needs to recover the font and styles of text.

Each font can be characterized by the following attributes (See S. Öztürk, B. Sankur, and A. Abak, "Font clustering and classification in document images," In EUPSICO 2000: European signal processing conference, pp. 881-884, 2000, incorporated herein by reference in its entirety):

Font family: the type of font like Tahoma, Traditional Arabic . . . etc.

Size: the size of characters.

Weight: It is the thickness of the character outlines relative to their height. It can be normal or bold.

Slant: Orientation of the letter main stroke. Letter can be Roman or Italic.

OFR can be combined with OCR using one of three approaches: priori, posteriori, and Cooperative/hybrid. See H. Shi and T. Pavlidis, "Font recognition and contextual processing for more accurate text recognition," Proceedings of the Fourth International Conference on Document Analysis and Recognition, vol. 1, pp. 39-44, 1997; A. Zramdini and R. Ingold, "Optical Font Recognition Using Typographical Features," IEEE Transactions on Pattern Analysis and Machine Intelligence, vol. 20, no. 8, pp. 877-882, 1998; and I. Chaker and M. Harti, "Recognition of Arabic Characters and Fonts," International Journal of Engineering Science, vol. 2, no. 10, pp. 5959-5969, 2010, each incorporated herein by reference in its entirety. In the priori approach, the font is identified before characters recognition, whereas posteriori approach depends on the contents of the text to identify the font. A Cooperative approach combines priori and posteriori approaches. See A. Zramdini, "Study of optical font recognition based on global typographical features," University of Fribourg, Phd Theses, 1995, incorporated herein by reference in its entirety.

Arabic language is spoken and used in Arabic countries in addition to the majority of Islamic countries (e.g. Malaysia and Indonesia) that read and write Arabic scriptures. Moreover, some West African languages such as Hausa and non-Semitic languages like Malay, Farsi, and Urdu use Arabic characters for writing.

Arabic language consists of 28 characters. Due to the cursive nature of Arabic language, most of its characters adopt several shapes based on their word location. Moreover, Arabic characters may take different shapes based on the font of those characters. For Arabic and Farsi languages, there are more than 450 fonts available. See F. Slimane, S. Kanoun, A. M. Alimi, R. Ingold, and J. Hennebert, "Gaussian Mixture Models for Arabic Font Recognition," 2010 20th International Conference on Pattern Recognition, pp. 2174-2177, August 2010, incorporated herein by reference in its entirety. This vast variety of fonts renders the task of recognizing the font type a challenging task. Font recognition may be an important preprocessing step in an Optical Character Recognition (OCR) system. In such case, if the font type is recognized, then a mono-font OCR is used.

OCR systems can be divided into two categories: Mono-font and Omni-font systems. Mono-font OCR systems have higher accuracy since it assumes a prior knowledge of the used font, whereas Omni-font OCR systems can recognize characters of already trained fonts using a base of font models. Omni-font OCR have lower accuracy because it deals with documents written by a number of fonts.

The aim of OFR is to recognize the font based on features that are extracted from text images. Similar to other pattern recognition approaches, OFR consists of three main stages: preprocessing, features extraction, and classification. The preprocessing stage involves preparing the input image for subsequent stages by applying de-noising, normalizing, text segmentation, skew correction, and image-format conversion techniques of the input image. Then the pre-processed image is transformed into feature vectors in the feature extraction stage. This representation contains discrete information which is used in the classification stage to recognize the font styles. See X. Jiang, "Feature extraction for image recognition and computer vision," In Computer Science and Information Technology, 2009. ICCSIT 2009. 2nd IEEE International Conference on, pp. 1-15, IEEE, 2009, incorporated herein by reference in its entirety.

The preprocessing stage includes several tasks that are initially performed to produce a an enhanced version of the original image for feature extraction. See H. Izakian, S. A. Monadjemi, B. T. Ladani, and K. Zamanifar, "Multi-Font Farsi/Arabic Isolated Character Recognition Using Chain Codes," World Academy of Science, Engineering and Technology, vol. 43, pp. 67-70, 2008, incorporated herein by reference in its entirety. Poor or low-resolution scanning can instill in document images much undesirable information such as noise, skew, etc. Since the feature extraction phase is typically sensitive to these properties, they can affect its performance and hence degrade the accuracy of the OFR system. See B. Bataineh, S. Norul, H. Sheikh, and K. Omar, "Arabic Calligraphy Recognition Based on Binarization methods and Degraded Images," vol. 3, no. June, 2011, incorporated herein by reference in its entirety. Therefore, several enhancement operations on the image are needed prior to the feature extraction phase such as binarization, de-noising, skew correction, segmentation, normalization . . . etc. Such enhancement processes are required to enhance the image before the feature extraction phase.

Binarization involves converting the text image from grayscale to binary image. A binary image is a digital image that has only two intensity values (0 and 1) for each pixel, which are displayed as black (text) and white (background), respectively. Researchers commonly use a thresholding method for image binarization. See Y. Pourasad, H. Hassibi, and A. Ghorbani, "Farsi Font Recognition Using Holes of Letters and Horizontal Projection Profile," *Innovative Computing Technology*, pp. 235-243, 2011; Y. Pourasad, H. Hassibi, and A. Ghorbani, "Farsi Font Recognition in Document Images Using PPH Features," nobel.gen.tr, vol. 5, no. 3, pp. 17-20, 2011; and A. Borji and M. Hamidi, "Support Vector Machine for Persian Font Recognition," *Engineering and Technology*, vol. 2, no. 3, pp. 10-13, 2007, each incorporated herein by reference in their entirety. Otsu technique is commonly used to binarize the input image as it automatically estimates the suitable threshold level. Otsu's thresholding method is based on the shape of the histogram. See N. Otsu, "A threshold selection method from gray-level histograms," *IEEE Transactions on Systems, Man and Cybernetics*, vol. 9, no. 1, p. 62, 66, January 1979, incorporated herein by reference in its entirety. This method assumes that the image contains bi-model histograms (foreground and background). It finds the threshold that minimizes the weighted sum of within-group variances for the two groups that result from separating the gray tones at the threshold.

Bataineh et al. proposed a binarization method based on adaptive thresholding and a fixed window size. See Bataineh, Bilal, Siti N H S Abdullah, K. Omar, and M. Faidzul. "Adaptive Thresholding Methods for Documents Image binarization," In Pattern Recognition, pp. 230-239. Springer Berlin Heidelberg, 2011, incorporated herein by reference in its entirety. They compared their proposed method with three other binarization methods (viz. Niblack, Sauvola, and Nick methods). See K. Khurshid, I. Siddiqi, C. Faure, and N. Vincent, "Comparison of Niblack inspired binarization methods for ancient documents," *In IS&T/SPIE Electronic Imaging*, pp. 72470U-72470U. International Society for Optics and Photonics, 2009 and J. Sauvola, T. Seppanen, S. Haapakoski, and M. Pietikainen, "Adaptive document binarization," In Document Analysis and Recognition, 1997., Proceedings of the Fourth International Conference on, vol. 1, pp. 147-152. IEEE, 1997, each incorporated herein by reference in their entirety. Their binarization formula is:

$$T_w = M_w - \frac{M_w^2 - \sigma_w}{(M_g + \sigma_w)(\sigma_{fix} + \sigma_w)},$$

where $T_w$ is the thresholding value, $M_w$ is the mean value of the window's pixels, $\sigma_w$ is the standard deviation of the window, and $M_g$ is the mean value of all pixels in the image. $\sigma_{fix}$ is a fixed standard deviation of the window which is computed as following:

$$\sigma_{fix} = \frac{\sigma_w - \sigma_{min}}{\sigma_{max} - \sigma_{min}},$$

where $\sigma_{max}$ and $\sigma_{min}$ are the maximum and minimum standard deviation values of all windows in the image, respectively. The proposed method reported higher performance than the three other methods. However, the need for prior window size setting is a drawback of this method. See B. Bataineh, S. N. H. S. Abdullah, and K. Omar, "An adaptive local binarization method for document images based on a novel thresholding method and dynamic windows," *Pattern Recognition Letters*, vol. 32, no. 14, pp. 1805-1813, October 2011, incorporated herein by reference in its entirety. Other techniques binarized the image in the preprocessing stage without stating any details about the used binarization technique. See L. Hamami and D. Berkani, "Recognition System for Printed Multi-Font And Multi-Size Arabic Characters," *The Arabian Journal for Science and Engineering*, vol. 27, no. 1, pp. 57-72, 2002, incorporated herein by reference in its entirety. Pourasad et al. used a threshold value of 1.4*K for binarizing the image where K is the threshold value obtained from Otsu global binarization method, whereas didn't perform binarization as they applied their feature extraction techniques directly on grayscale images. See H. Khosravi and E. Kabir, "Farsi font recognition based on Sobel-Roberts features," *Pattern Recognition Letters*, vol. 31, no. 1, pp. 75-82, 2010, incorporated herein by reference in its entirety. Different binarization techniques are shown in more details in the binarization method column in Table 1.

Noise is a natural phenomenon which may be introduced as a result of scanning, reproduction, or digitization of the original image. See Zhang, T. Y., and Ching Y. Suen, "A Fast Parallel Algorithm for Thinning Digital Patterns," Communications of the ACM, vol. 27, no. 3, pp. 236-239, 1984. De-noising is needed to enhance the image, which results in improved features and recognition rates.

Few techniques were used for de-noising the images before applying AFR. The used techniques mostly applied de-noising as part of edge detection and enhancement using derivative based operations like the Canny edge detector, the Laplacian operator. In one case the Median filter was used. Other cases assumed that the noise was removed from the images.

Hamami and Barkani used median filter to remove the limited noise from the text images. Using Median filter each point in the image is replaced by the median value of its eight neighbors. Bataineh et al. in applied Laplacian filter to detect edges and remove noise. Chaker et al. removed unwanted noise during the edge detection phase using Canny edge detector. See J. Canny, "A computational approach to edge detection.," *IEEE transactions on pattern analysis and machine intelligence*, vol. 8, no. 6, pp. 679-98, June 1986, incorporated herein by reference in its entirety. This detector smoothes the images by convolving it with a Gaussian filter. Ben Amor et al. removed the noise in the preprocessing phase without stating their used technique. Pourasad et al. removed the noise and performed the necessary corrections manually by using photo-editing software. Moreover, Zahedi and Eslami assumed that their SIFT technique is flexible against small noise. See M. Zahedi and S. Eslami, "Farsi/Arabic optical font recognition using SIFT features," *Procedia Computer Science*, vol. 3, pp. 1055-1059, January 2011, incorporated herein by reference in its entirety.

Table 1 lists the used de-noising technique by each recognition technique. It is clear from the table that researchers commonly used the Laplacian filter for noise removal. Other techniques assumed that noise was removed at the preprocessing stage without stating their used technique. See I. S. Abuhaiba, "Arabic Font Recognition Using Decision Trees Built From Common Words," Journal of Computing and Information Technology, vol. 13, no. 3, pp. 211-224, 2005 and S. Ben Moussa, A. Zahour, A. Benabdelhafid, and A. M. Alimi, "New features using fractal multi-dimensions for generalized Arabic font recognition," *Pattern Recognition Let-* ters, vol. 31, no. 5, pp. 361-371, April 2010, each included herein by reference in their entirety.

Image skew may be introduced during document scanning due to incorrect alignment of the scanned page and hence may cause serious problems for document analysis. See Cao, Y., Wang, S., & Li, H., "Skew Detection and Correction in Document Images Based on straight-line fitting," Pattern Recognition Letters, 24(12), pp. 1871-1879, 2003. Therefore, most OFR techniques involve skew correction in the preprocessing stage. Skew correction is usually invoked by techniques that work at the block levels, or paragraph level, whereas most of the techniques that work at the character level did not use skew correction.

Hough-based transform is more often used although it has high time complexity and gives poor results when de-skewing images include sparse text. See T. Saba, G. Sulong, and A. Rehman, "Document image analysis: issues, comparison of methods and remaining problems," *Artificial Intelligence Review*, vol. 35, no. 2, pp. 101-118, November 2011 and Sun, C., & Si, D, "Skew and slant correction for document images using gradient direction," Document Analysis and Recognition, 1997., Proceedings of the Fourth International Conference on. Vol. 1. IEEE, 1997, each incorporated herein by reference in their entirety. In addition, it is used at the paragraph level, which limits its application in AFR as different font sizes and styles may be used for different text lines or even words.

The Hough transform can be used for correcting the skewed images. Each point (x, y) in the original image is mapped to all points in the (ρ, θ) Hough space of lines through (x, y) with distance ρ from the line and slope θ. Peaks in the Hough space are then used to find the dominant lines and thus the skew. The Difficulty in correcting the skew in images with sparse texts is one limitation of the Hough transform technique. Moreover it is language dependent.

The Singh technique is an additional method for skew correction. Singh technique for skew detection and correction consists of three steps. See C. Singh, N. Bhatia, and A. Kaur, "Hough transform based fast skew detection and accurate skew correction methods," *Pattern Recognition*, vol. 41, no. 12, pp. 3528-3546, 2008. First step is to reduce the number of image pixels by using a modified form of block adjacent graph. The second step detects the skew by using Hough transform. Finally, the final step corrects the skew by using both forward and inverse rotation algorithms. Ben Moussa et al. resolved skewing by using Box Counting Dimension (BCD) and Dilation Counting Dimension (DCD) features which are invariant to rotation.

Skew corrections can be performed manually by using photo-editing software, or they can be performed using a scale invariant feature transform (SIFT) feature extraction technique, which is invariant to rotation. Other technique assumed that the images have already been de-skewed and the text lines were fairly horizontal.

The skew correction method column is shown in Table 1. Table 1 lists some of the techniques used in various approaches to OFR. Table 2 shows techniques that work at the character level and which do not use any skew correction technique—skewing at the character level is considered to be an intrinsic characteristic for each font and hence is needed in the feature extraction stage.

Segmentation involves dividing the input image into smaller components (sub-images). Segmentation is typically performed at one of four levels: lines, words, connected components, and characters. Character segmentation is the most difficult, particularly in Arabic text as it is cursive, and has significant effect on the recognition process.

To segment the image text into lines, it is common to use the horizontal projection method. With the horizontal projection method, peaks represent the writing lines, whereas valleys represent spaces between lines. The vertical projection method is normally used to extract the connected components of each line. In the vertical projection approach; histogram peaks are the main vertical parts of the connected components, whereas valleys are the spaces between those components.

A common method uses horizontal and vertical projections to segment lines, words/sub-words and characters. This method works well because of the simplicity of the implementation, assuming that the input images are of good quality, little or no skew and tolerable levels of noise. In real documents, this may not be the case, hence resulting in wrong segmentation. Document skew may result in problems as the projected text may not be separated by spaces and hence the technique will fail. A more robust technique is by splitting the image into vertical strips and applying the segmentation to each strip. This modification was applied in M. Sarfraz, S. Mahmoud, and Z. Rasheed, "On Skew Estimation and Correction of Text," In Computer Graphics, Imaging and Visualisation (CGIV '07), pp. 308-313, IEEE, 2007 and M. Tanvir Parvez and S. a. Mahmoud, "Arabic handwriting recognition using structural and syntactic pattern attributes," *Pattern Recognition*, vol. 46, no. 1, pp. 141-154, January 2013, each incorporated herein by reference in their entirety. Another approach is to use large blobs for finding the expected lines then add smaller components to these lines for each strip then combine the strips of lines into full lines.

In one method to segment the input text images into characters, the horizontal histogram (projection) is used to detect the text lines. Then the connected components in each line were located using vertical projection. In order to segment the connected components into characters, the beginning and end of each character were determined based on a set of pre-defined rules. The beginning of the character (starting column) is the column whose vertical histogram is greater than a threshold value. The end of the character (final column) is the column that satisfies a number of other rules. First, its top and bottom lines must be greater and less than the junction line, respectively. A junction line is a line that has the highest number of black pixels. Second, the difference between the bottom and top lines must be less than or equal to a threshold. Third, the top line of this column must be above the top line of the starting column. Fourth, the number of vertical transitions must be equal to two. Finally, the vertical histogram must be less than another threshold. Having this large number of rules and thresholds produces difficulties in accurately calculating them and are usually constrained to a certain text quality. A vertical histogram can be used for character segmentation with some variations. To segment the text image into characters, they first segmented the text image into lines by using the pixel position of the highest block. Then using the vertical histogram, the text line is segmented into characters. The beginning of the character is located through vertical histogram by finding a point where the number of its black pixels is greater than the number of the black pixels of previous points. This scanning continues until it finds a point that has a number of black pixels less than a certain ratio of the previous point. The main body of each character is considered to lie between that ending point and the beginning point. By using vertical histogram, this algorithm continues locating the end of each character and the beginning of the following character by searching for a point where the number of black pixels is greater than a certain ratio of the number of black pixels of the previous points. FIG. 1 shows the start and end points of two different characters ـم and ـد.

Vertical projection is usually used to detect white spaces between successive characters for non-cursive writing or between connected components. See R. G. Casey and E. Lecolinet, "A Survey of Methods and Strategies in Character Segmentation," *IEEE Transactions on Pattern Analysis and Machine Intelligence*, vol. 18, no. 7, pp. 690-706, 1996, incorporated herein by reference in its entirety. It should be noted that the character segmentation algorithms that use vertical projection fail in segmenting ligature characters (overlapped characters) like لا and حـ as well as touching characters. FIG. 2 shows some Arabic ligature characters.

It can be assumed that the image text is already segmented into words, whereas other approaches worked at the character level, hence avoiding the difficulties associated with character segmentation. Other AFR techniques may not need segmentation at all depending on the used feature extraction technique or on the used features. See M. B. Imani, M. R. Keyvanpour, and R. Azmi, "Semi-supervised Persian font recognition," *Procedia Computer Science*, vol. 3, pp. 336-342, January 2011, incorporated herein by reference in its entirety. Zehadi and Eslami used a Scale Invariant Feature Transform (SIFT) for font recognition at the paragraph level without the need for segmentation. Moreover, techniques that use global features extraction technique can work at the paragraph level or need only segment the text into lines to construct blocks of text.

Table 1 shows the different published segmentation techniques. The Segmentation method column in Table 1 states the segmentation method used by each technique. This table shows that only a few techniques addressed the segmentation at the character level, whereas other techniques are applied at the word level, the line level, or the paragraph level. Moreover, other techniques that use global features extraction technique need to segment the text into lines to construct blocks of text or it can work at the paragraph level.

Usually there are two categories of feature extraction techniques: local analysis and global analysis. Global features can be extracted easily from the whole text image or a block of texture, while local features are extracted from small units like characters and are more difficult to extract than global features. See H. Ahmed and S. Shukla, "Comparative Analysis of Global Feature Extraction Methods for Off-line Signature Recognition," *International Journal of Computer Applications*, vol. 48, no. 23, pp. 15-19, July 2012, incorporated herein by reference in its entirety. Therefore, researchers utilizing global features usually normalize text images to generate a texture block that can be used in the features extraction phase. Researchers use normalization to make their techniques size invariant.

The normalization step was performed after image binarization. To construct text blocks, the spaces between words were removed first. Then, the incomplete lines were filled up. After that, a text block consisting of a number of lines (five lines) and of size 512×512 (96 dpi) is constructed for use in the feature extraction phase. Khosravi and Kabir normalized text lines with respect to their height since the same-size fonts share the same height independent of their font style. Next, they removed large whitespaces between words of the normalized lines. To construct a texture, the input line is segmented into several parts of 128 pixels each and concatenated from top to bottom into 128×128 texture bitmap. This size was selected based on the height and width of the line in an A4 document with a 100 dpi resolution. One limitation of this method is that it constraint the font recognition to only lines with width greater than 64 pixels. In addition, this technique will not work if more than one font is used in the same line. After locating the words in each line by vertical projection, Borgi and Hamidi normalized the spaces between words by scaling them to a predefined length. If the document still contains spacing, they filled it up by repeating the first line to get an image of 300×300 size. This new image is in turn divided into 25 non-overlapping blocks. This technique suffers from the same limitations of. Imani et al. applied a gridding approach to divide each texture of size 128×128 pixels into 16 sub-blocks of size 32×32 pixels each. Whereas Slimane et al. normalized the word images into 45 pixels height to be compatible with the size of the window used in their feature extraction phase. Table 1 shows that the normalization techniques used by researchers. The size of the constructed block is shown for the techniques that segmented the image into blocks to extract features.

Thinning or skeletonization can also be used. Thinning/Skeletonization algorithms normally produce spurious tails, Zig-Zag lines and small loops. See S. Mahmoud, I. Abuhaiba, and R. Green, "Skeletonization of Arabic characters using clustering based skeletonization algorithm (CBSA)," *Pattern Recognition*, vol. 24, no. 5, pp. 453-464, 1991, incorporated herein by reference in its entirety. The skeleton of characters can be extracted by thinning the characters to one point thickness using a thinning method proposed by Haralick in R. M. Haralick, "A Comment on 'A Fast Parallel Algorithm for Thinning Digital Patterns'," *Communications of the ACM*, vol. 29, no. 3, pp. 239-242, 1986, incorporated herein by reference in its entirety. This method consists of two stages; In the first stage, the south-east boundary points and the north-west corner points are detected, while the north-west boundary points and the south-east corner points are detected in the second stage. This technique has several disadvantages as noise is amplified, some structures are destroyed, and some digital patterns may disappear. The thinning technique column in Table 1 lists the skeletonization technique used by each approach.

Only few researchers addressed edge detection in their AFR systems. These techniques mainly used gradient operators like the Laplacian operator for edge detection. The edges of texts can be detected by applying a Laplacian filter with a 3×3 kernel matrix. The Laplacian filter values and the final output of applying it on an image are shown in FIG. 3.

A skeleton procedure can be used, after applying the Canny operator, to obtain a thin edge with one pixel width. The Canny edge detector first smoothes the image and then estimates the gradients of the image where a large magnitude indicates an edge. The gradient array is further reduced by hysteresis, which searches along the remaining pixels that have not been suppressed. Two thresholds (low and high) are used. A pixel is marked as an edge if it has a magnitude value greater than the first threshold. Moreover, any pixels connected to this edge pixels and has a value greater than the second threshold are marked as edge pixels. On other hand, pixels that have values less than the first threshold are marked as non-edge pixels. Other pixels that are between the first and second thresholds are set to zero until a path from these pixels to a pixel with value greater than the second threshold is found. See R. P. Vignesh and R. Rajendran, "Performance and Analysis of Edge detection using FPGA Implementation," 2012, incorporated herein by reference in its entirety. Table 1 lists the Edge detection techniques used by each approach. The Laplacian filter is used by most researchers to detect edges in the preprocessing stage.

TABLE 1

| paper | Recognition Level | Binarization Method | De-noising Technique | Skewing Method | Segmentation Method | Thinning Technique | Edge Detection Technique | Image Normalization | Block Size |
|---|---|---|---|---|---|---|---|---|---|
| Gowely et al. (1990) | Character | — | — | — | Proposed | — | — | — | |
| Hamami et al. (2002) | Character | — | Median filter | — | Proposed | — | — | — | |
| Amor et al. (2006) | Character | — | — | — | Pre-Segmented | — | — | — | |
| Izakian et al (2008) | Character | — | — | — | Pre-Segmented | Zhang et al. technique | — | — | |
| Chaker et al. (2010) | Character | — | Gaussian filter | — | Pre-Segmented | Homotopic thinning | Canny Edge detector | — | |
| Abuhaiba (2005) | Word | — | — | — | Pre-Segmented | — | — | — | |
| Slimane et al. (2010) | Word | — | — | — | Pre-Segmented | — | — | Vertical | |
| Pourasad et al. (2011) | Line | Otsu | Manual | Manual | Projection | — | — | — | |
| Khosravi et al. (2010) | Line | — | — | — | Projection | — | — | Block construction | 128 * 128 |
| Bataineh et al. (2011) | Block | Adaptive thresholding | Laplacian Filter | Singh et al. technique | Projection | — | Laplacian filter | Block construction | 512 * 512 |
| Batainch et al. (2012) | Block | Otsu | Laplacian Filter | Singh et al. technique | Pre-Segmented | — | Laplacian filter | Block construction | 512 * 512 |
| Zahedi et al. (2011) | Paragraph | — | — | — | Pre-Segmented | — | — | — | |
| Ben Moussa et al. (2010) | Line and Paragraph | — | — | — | — | — | — | — | |
| Imani et al. (2011) | Texture | — | — | — | — | — | — | Block construction | 32 * 32 |
| Borji et al. (2007) | Texture | Ostu | — | — | Projection | — | — | Block construction | 100 * 100 |

Feature extraction is an important phase of AFR. Researchers have used many types of features. Gradient features, pixel regularity, edge regularity, Box Counting Dimension (BCD), Wavelet energy, Gabor features, and structural features like vertex angle, length holes, thickness ratio, perimeter, area, . . . etc. The used features are detailed below.

In one approach, Arabic characters and fonts are identified based on a dissimilarity index. They calculated the dissimilarity index based on its shape index as shown in FIG. 4. This index consists of Polar distance ($d_i$), Polar angle ($\theta_i$), Vertex angle ($a_{i+1}$), and Chord length parameters ($L_i$) which were calculated from the polygonal representation of the character edges. After obtaining the shape index, the dissimilarity measure was calculated to recognize the character and font by comparing it against other models of characters and fonts in the database. The drawback of using polygonal approximation is its complexity, instability to geometric transformation, and little robustness.

In a second approach, the features are extracted based on the behavior of the edge pixels. This technique aims to analyze the texture of the binary image based on representing the relations between adjacent pixels. After applying text normalization and edge detection in the preprocessing stage, multiple statistical features are extracted. These features are generated from weights, homogeneity, pixel regularity, edge regularity, edge direction features, and optionally correlation. To extract such features, Edge Direction Matrix (EDM) statistical technique was used. EDM technique is based on representing the relationship between each pixel in the edge and its two neighboring pixels by applying eight neighboring kernel matrix as shown in FIG. 5($a$). Then the direction angle between the scoped pixel and its eight neighboring pixels were calculated as shown in FIG. 5($b$). Two levels of relationships were used; first-order and second-order. With the first-order relationship (also called EDM1), a value between 0 and 315 degrees is stored which represents the directional angle between the scoped pixel and all neighboring pixels. Then the number of occurrences is calculated for each value in EDM1. FIG. 5($a$) shows the relationship between edge pixels and two neighboring pixels.

In the Second-order relationship, only one representation was used to represent each pixel. The relationship priority was then determined by arranging EDM1 values in descending order. Then the most important relationship (high-order) was taken while others were ignored. Finally, EDM2 was filled by calculating the obtained relationships that were stored in the scoped cell in EDM2 as illustrated in FIG. 6($b$).

In one approach, Arabic font recognition can be performed using an extraction algorithm. After locating the words in the preprocessing stage, he extracted 48 features from those words. Sixteen features were extracted using horizontal projections of the word image and the following equation:

$$h(y) = \Sigma_N I(x,y), y=0,1,\ldots,N-1,$$

where N is the word height after normalization. Then 1-D Walsh discrete transform of the horizontal projections h(y) was used to find 16 Walsh coefficients using the following equation:

$$w(u) = 1/N + \Sigma_{y=0}^{N-1} h(y)\|_{i=0}^{n-1} (-1)^{bi(y)bn-1-i(u)},$$

where $N=2^n$ and $b_k(z)$ is the kth bit in the binary representation of z. In addition to that, he used other features (viz. 7 invariant moments, width, height, thinness ratio, perimeter, area, x and y coordinates of area center, aspect ratio, and direction of axis of the least second moment).

Arabic fonts can be recognized by a technique in which fifty one features are used in a Gaussian Mixture Model (GMM) using a sliding window technique for features. The sliding window technique helps in extracting features without the need to segment the words into characters. Their used features were the number of connected black and white components, ratio between them, vertical position of the smallest black component, the sum of the perimeter of all components divided by the perimeter of the analysis window, compactness, gravity, log of baseline position, the vertical position of baseline, number of extrema in vertical and horizontal projections, and the vertical and horizontal projection after resizing the window. Ben Moussa et al. used fractal dimension approach for font recognition. To estimate the fractal dimension, they used two estimation methods: Box Counting Dimension (BCD) and Dilation Counting Dimension (DCD).

BCD is used to cover the texture distribution in two-dimensional images, while DCD is used to cover vision aspects. They used BCD and DCD with different box sizes and radiuses. BCD of sizes 15 and 20, and DCD of radiuses 15 and 20 were the extracted features.

In one approach Arabic and Farsi fonts can be recognized using the Sobel-Robert's Features (SRF). These features were based on combining Sobel and Robert gradients in 16 directions to represent the directional information of the texture. Sobel operators use the information of the 8 neighbors to obtain the horizontal and vertical gradients, while Robert's operator use the information of the 4 neighbors to get diagonal gradients. To extract these features, text blocks of size 128×128 were constructed. Then each input block was divided into 16 sub-blocks (4×4 windows) of size 32×32 each. For each pixel in each sub-block, they computed the gradient values using the Sobel operator and extracted both gradient phase and magnitude. The phase was then quantized into 16 angles from 0 to 30π/16. This results in 16 features, which correspond to 16 phases for each sub-block, and 256 (16×16) features for the whole block. Similarly, the Robert's operator was computed to give 256 additional features. Sobel and Roberts then were concatenated to form a 512 feature vector for each text block. Due to differences in the range of Sobel and Robert's features, both features were normalized separately to unit magnitude before concatenation and the result of the concatenation was called the Sobel-Robert's features (SRF), which are later normalized to unit magnitude as well. One disadvantage of this technique is that it cannot recognize the fonts in a line that contains more than one font. See Y. Pourasad, H. Hassibi, and A. Ghorbani, "Farsi Font Face Recognition in Letter Level," Procedia Technology, vol. 1, pp. 378-384, January 2012, incorporated herein by reference in its entirety.

In M. Zahedi and S. Eslami, "Farsi/Arabic optical font recognition using SIFT features," *Procedia Computer Science*, vol. 3, pp. 1055-1059, January 2011, reserachers used the scale invariant feature transform (SIFT) to recognize Farsi fonts. The main function of SIFT is to detect and describe key points of objects in images that is used to identify objects. See D. G. Lowe, "Object Recognition From Local Scale-Invariant Features," in Proceedings of the Seventh IEEE International Conference on Computer Vision, pp. 1150-1157 vol. 2, 1999, incorporated herein by reference in its entirety. The key feature of this method is robustness to mild distortions, noise, illumination and changes in image scale. To extract features (key points) using the SIFT method, a staged filtering approach was used. In the first stage, Gaussian scale-space function filters out a set of key locations and scales which are recognizable in different views of the same object. Then to locate stable key points, the difference of Gaussian (DoG) function was calculated by finding the difference between two images; one is of 'k' times scale the other. This stage would identify key locations by looking for the extreme points resulting from applying DoG. Poorly located and low contrast points on the edges were not used in the next filtering stage. The derived SIFT points were then stored and indexed in the database. Computation time especially for large datasets is one drawback of this technique, so they proposed using Speed Up Robust Features (SURF) that is inspired by SIFT and requires computation time.

A feature extraction technique can be based on wavelets. To obtain a feature vector from each sub-block (text image was divided into 16 sub-blocks with 32×32 size for each block) a combination of wavelet energy and wavelet packet energy features were used. The wavelet energy is the sum of square of the detailed wavelet coefficients in vertical, horizontal, and diagonal directions. The wavelet energy for an image of size N×N in horizontal, vertical, and diagonal directions at the i-level were calculated respectively as follows:

$$E_i^h = \sum_{x=1}^{N} \sum_{y=1}^{N} (H_i(x, y))^2$$

$$E_i^v = \sum_{x=1}^{N} \sum_{y=1}^{N} (V_i(x, y))^2$$

$$E_i^d = \sum_{x=1}^{N} \sum_{y=1}^{N} (D_i(x, y))^2$$

The value of wavelet energy in all levels ($E_i^h$, $E_i^v$, $E_i^d$)$_{i=1, 2, \ldots, K}$ where k is the total wavelet decomposition forms the wavelet energy feature vector. After decomposing the high-frequency components, wavelet packet transform constructs a tree-structured multiband extension of the wavelet transform. The average energy was calculated after decomposing the image and extracting the related wavelet packet coefficients as follows:

$$E = \frac{1}{N*N} \sum_{i=1}^{N} \sum_{j=1}^{N} [s(i, j)]^2,$$

where s(i,j) is the wavelet coefficient of a feature sub image in N×N window centered at pixel (i,j).

Features can be extracted base on texture analysis by using multichannel Gabor filtering and gray scale co-occurrence matrices. For example, twenty-four Gabor channels can be used. To extract features, all 24 filters were applied for each block (9 non-overlapping blocks for each image). Then another image was derived by taking the maximum of these filter responses per pixel. To represent texture features, the mean value and standard deviations of the channel output image (over each block) were chosen which formed a 50-dimensional feature vector extracted from each block.

To recognize Farsi fonts and sizes, two types of features can be used. For example, one feature can be related to the letters' holes, whereas the second is related to the horizontal projection profile. To obtain the first feature, a bounding box of holes was constructed after extracting holes of the document text. Then a histogram of box size was obtained which was considered as a feature. Second type of features was extracted from the horizontal projection profile of text lines. These features consisted of the height of the text line, distance between top of the text line and the baseline, distance between bottom of the text line and baseline, location of the second or third maximum of horizontal projection profile related to the location of the baseline. Table 2 lists features used in several references.

TABLE 2

| Paper | Features |
|---|---|
| Abuhaiba (2005) | Width, Height, Thinness ratio, Perimeter, Area, x and y coordinates of area center, Aspect ratio, Invariant moments (7), Direction of axis of least second moment, Walsh coefficients (16), and horizontal projection features (16). |
| Borji et al. (2007) | Mean and standard deviation of 24 Gabor (8 orientations with 3 wavelengths) |
| Chaker et al. (2010) | Polar distance, Polar angle, Vertex angle, and Chord length polygonal attributes of character edges. |
| Ben Moussa et al. (2010) | Box Counting Dimension (BCD) with two sizes: 15 and 20, and Dilation Counting Dimension (DCD) with two radiuses: 15 and 20 |
| Pourasad et al. (2010) Pourasad et al. (2011) | One feature is related to letters' holes, while other features which are related to are related to the horizontal projection profile are height of text line, distance between top of text line and base line, distance between bottom of text line and base line, location of second or third maximum of horizontal projection profile related to the location of base line. |
| Slimane et al. (2010) | The number of connected black and white components, ratio between them, vertical position of the smallest black component, the sum of perimeter of all components divided by the perimeter of the analysis window, compactness, gravity, log of baseline position, the vertical position of baseline, number of extrema in vertical and horizontal projections, and the vertical and horizontal projection after resizing the window used for features extraction |
| Khosravi et al. (2010) | A combination of Sobel and Robert gradients in 16 directions |
| Bataineh et al. (2011) Bataineh et al. (2012) | Weights, homogeneity, pixel regularity, edge regularity, edge direction, and correlation. |
| Zahedi et al. (2011) | key points |
| Imani et al. (2011) | Wavelet energy and Wavelet packet energy |

Font recognition is the final phase of an AFR system. Extracted features from the feature extraction phase are provided into the recognizer to identify the font type, style, etc.

Researchers used different feature types in the feature extraction phase, various numbers of fonts in the training and testing phases, and different databases. These differences, especially in the used data, make it inappropriate to compare the identification rates. The different data is justified by the lack of a benchmarking database for Arabic font recognition. Researchers have also differed in the used classification technique. They used K-nearest neighbor, decision trees, neural networks, support vector machines and Gaussian mixtures; just to name a few.

In I. Chaker and M. Harti, "Recognition of Arabic Characters and Fonts," *International Journal of Engineering Science*, vol. 2, no. 10, pp. 5959-5969, 2010, Chaker et al. recognized the font type against other font models in the database using Polar distance, Polar angle, Vertex angle, and Chord length polygonal attributes of character edges features. By finding the minimum dissimilarity measure, the characterized character was classified to one of ten fonts. 100% recognition rate is reported for this technique on a dataset of 10 Arabic fonts and 360 characters for testing. The used dataset is limited which is considered as a limitation of this technique. Moreover, the complexity, the stability, and robustness are problems with polygonal approximation methods. See I. Debled-Rennesson, "Multiorder polygonal approximation of digital curves," Electronic Letters on Computer Vision and Image Analysis, vol. 5, no. 2, pp. 98-110, 2005, incorporated herein by reference in its entirety. Furthermore, recognizing fonts that are morphologically similar like Arabic Transparent and Simplified Arabic is a more challenge task and may result in lower recognition rates.

In B. Bataineh, S. Norul, H. Sheikh, and K. Omar, "Arabic Calligraphy Recognition Based on Binarization methods and Degraded Images," vol. 3, no. June, 2011, Bataineh et al. proposed a technique to recognize of Arabic calligraphy fonts based on 22 statistical features (viz. Weights, homogeneity, pixel regularity, edge regularity, edge direction, and correlation). To identify one of the seven Arabic calligraphy types, they used a back-propagation neural network (BPNN). This classifier was used with 22, 18, and 7 nodes in the input, hidden, and output layers, respectively. To evaluate the proposed technique, two types of experiments were conducted. The first experiment was to compare the performance of the text normalization based on the proposed binarization method with three other methods (viz. Niblack, Sauvola, and Nick methods), while the second experiment evaluated the performance of the texture features effectiveness and the accuracy of the recognition phase. A dataset of fourteen Arabic degraded document images were used for their experiments. The first experiment reported higher performance for the proposed binarization method (92.8%) than the other three methods, while the accuracy rate of the second experiment was 43.7%. The problem with the proposed method is the need for prior window size setting. Moreover, 43.7% accuracy is too low and the dataset is limited. Bataineh et al. proposed a technique to classify the Arabic calligraphies into one of seven fonts using weights, homogeneity, pixel regularity, edge regularity, and edge direction features. To evaluate this technique, they compared their technique with the Gray Level Co-occurrence Matrix (GLCM) technique developed by Haralick et al. using Bayes network, Multilayer Network and Decision Tree classifiers. See R. M. Haralick, K. Shanmugam, and I. Dinstein, "Textural Features for Image Classification," *IEEE Transactions on Systems, Man, and Cybernetics*, vol. 3, no. 6, pp. 610-621, November 1973, incorporated herein by reference in its entirety. These experiments were conducted on a dataset of seven fonts consisting of 420 samples for training and 280 samples for testing. The reported experimental results showed that this method obtained higher performance (95.34%) with Multilayer Network classifier whereas GLCM rate is (87.14%) with the same classifier. Moreover, the proposed technique reported an accuracy of 92.47% and 97.85% using Bayes network and Decision Tree classifiers respectively, whereas the GLCM technique reported 77.85% and 85.71% using the same classifiers. Their database of 700 samples for seven fonts is limited.

In Bataineh, B., Abdullah, S. N. H. S., & Omar, K., "A novel statistical feature extraction method for textual images: Optical font recognition," *Expert Systems with Applications*, vol. 39, no. 5, pp. 5470-5477, April 2012., Bataineh et al. tested their feature extraction method based on the relationship between edge pixels on the image using five different classifiers. The used classifiers were decision table rules, artificial immune systems (AIS), multilayer neural networks, decision trees, and Bayesian networks. Based on the experimental results, a decision tree classifier was chosen as the best classifier to be used with the proposed technique. To evaluate this method, comparison with gray-level co-occurrence matrix (GLCM) method was reported on a dataset consisting of seven fonts and 100 image samples for each font. Using decision tree, the proposed method obtained higher rate of (98.01%) than the GLCM method (86.11%).

A decision tree classifier can be used to classify the samples into one of three fonts. For example, using 48 features with 72000 samples for training and 36000 samples for testing, a recognition rate of 90.8% has been reported. See, I. S. Abuhaiba, "Arabic Font Recognition Using Decision Trees Built From Common Words," Journal of Computing and Information Technology, vol. 13, no. 3, pp. 211-224, 2005. The number of fonts is limited and the recognition rate is not suitable for practical applications.

In F. Slimane, S. Kanoun, A. M. Alimi, R. Ingold, and J. Hennebert, "Gaussian Mixture Models for Arabic Font Recognition," 2010 20*th International Conference on Pattern Recognition*, pp. 2174-2177, August 2010., Slimane et al. used Gaussian Mixture Model (GMM) with fifty one features. To extract the features, sliding window technique was used. They used Expectation-Maximization (EM) algorithm with 2048 Gaussian mixtures. To evaluate their approach, they used a dataset consisting of 10 fonts and 10 sizes from the APTI database. See F. Slimane, R. Ingold, S. Kanoun, A. Alimi, and J. Hennebert, "A New Arabic Printed Text Image Database and Evaluation Protocols," In 10th International Conference on Document Analysis and Recognition, pp. 946-950, 2009, incorporated herein by reference in its entirety. A total of 100,000 training and 100,000 testing samples were used in the experiments (1000 samples for each font size). With 2048 mixtures, a 99.1% recognition rate was reported. Shifting the constructed window to extract features by one pixel is considered time consuming.

Using BCD and DCD methods to estimate the fractal dimensions, Ben Moussa et al. used K-nearest neighbor classifier. To evaluate the proposed technique, two experiments were conducted; one for recognizing Arabic fonts, while the other for recognizing Latin fonts. A dataset consisting of 1000 block images of ten fonts and three sizes were used for the first experiment. They reported 96.6% recognition rate. For recognizing Latin fonts, a database of 800 block images were used and a 99.3% recognition rate was obtained.

In Y. Pourasad, H. Hassibi, and A. Ghorbani, "Farsi Font Recognition Using Holes of Letters and Horizontal Projection Profile," *Innovative Computing Technology*, pp. 235-243, 2011., Pourasad et al. used horizontal projection profile and holes of letters on seven fonts and seven sizes. Two datasets of 490 and 110 images were used in the experiments. They reported a 93.7% recognition rate. The database size is limited and the recognition rate is not suitable for practical applications. Alternatively a multi-layer Perceptron (MLP) classifier can be used with 40 hidden neurons to identify the font of the text lines based on Sobel and Roberts features (SRF). This technique requires much less computation time (3.78 ms) than an 8-channels Gabor technique (78 ms). A database consisting of 500 document images (20,000 line images) and ten Farsi fonts with sizes of 11-16 was used. After comparing the features with Gabor filters, they claimed that the new features are faster than an 8-channel Gabor filter by fifty times. By using the new features, a 94.16% recognition rate and a 14% improvement over the 8-channel Gabor filter (80%) was realized. A recognition rate of (94.16%) is low for practical applications. This technique cannot recognize the font types in lines that contain more than one font type.

In M. Zahedi and S. Eslami, "Farsi/Arabic optical font recognition using SIFT features," *Procedia Computer Science*, vol. 3, pp. 1055-1059, January 2011., Zahedi and Eslami in proposed another technique to recognize the Farsi fonts by using scale invariant feature transform (SIFT) method. They recognized the fonts based on the similarity between objects in the tested images and the extracted key points. See D. G. Lowe, "Object Recognition From Local Scale-Invariant Features," In Proceedings of the Seventh IEEE International Conference on Computer Vision, pp. 1150-1157 vol. 2, 1999, incorporated herein by reference in its entirety. To recognize the fonts in the test image, the features (key points) are extracted from the image and compared to a database of extracted key points to find the best set of matched key points. These points were used to find the best match from the database by using the nearest neighbor classifier. A least square-based method was used in the model verification stage to verify each group of features. Then, the least square-solution was performed again on the residual points to filter out outlier points. A match was identified as a correct recognition if a set of three or more points agreed on the models' parameters. They evaluated their technique over a dataset with 75 document images for testing for 20 font types. They claimed to achieve 100% recognition rate. Their database of 75 text images is limited in size. Furthermore, choosing fonts for testing that are morphologically similar like Arabic Transparent and Simplified Arabic is more challenging than their selected fonts. Moreover, the computation time especially for a large datasets is another drawback of this technique, that is why they proposed using Speed Up Robust Features (SURF) (inspired by SIFT) that has less computation time.

In M. B. Imani, M. R. Keyvanpour, and R. Azmi, "Semi-supervised Persian font recognition," *Procedia Computer Science*, vol. 3, pp. 336-342, January 2011., Imani et al. used SVM, RBFNN, and KNN classifiers in a majority vote approach to classify data to reliable and unreliable classes. By using this approach, unlabeled data is classified if two of the three classifiers agree on one font type. However, if each classifier predicts a different label, then the data will remain unlabeled and unreliable. This process is repeated iteratively by retraining the algorithm with the newly-labeled data and used it to classify the unreliable data. SVM and RBF classifiers were then used to classify the test data by using the labeled reliable data that resulted from the previous steps. A 95% recognition rate was reported. See F. Slimane, S. Kanoun, J. Hennebert, A. M. Alimi, and R. Ingold, "A study on font-family and font-size recognition applied to Arabic word images at ultra-low resolution," *Pattern Recognition Letters*, vol. 34, no. 2, pp. 209-218, January 2013, incorporated herein by reference in its entirety. In A. Borji and M. Hamidi, "Support Vector Machine for Persian Font Recognition," *Engineering and Technology*, vol. 2, no. 3, pp. 10-13, 2007, Borji and Hamidi proposed a method to extract 50 features that represent the texture of the text. They used global texture analysis and Gabor filters for feature extraction. Then two classifiers were applied: Weighted Euclidean distance and SVM. To evaluate their technique, a dataset of seven fonts and four styles was used. The reported average recognition rates were 85% with Weighted Euclidean distance and 82% with SVM. The recognition rates are too low for practical applications and the number of fonts and styles are limited.

Table 3 shows the dataset used by each technique in addition to the reported recognition rates and the used classifier.

TABLE 3

| Paper | Language | Fonts | Training dataset | Testing dataset | Recognition rate | | classifier |
|---|---|---|---|---|---|---|---|
| Abuhaiba (2005) | Arabic | 3 | 72,000 word images | 36,000 word images | 90.8% | | Decision tree |
| Borji et al. (2007) | Persian | 7 | | | 82% | (SVM) | SVM and WED |
| | | | | | 85% | (WED) | |
| Chaker et al. (2010) | Arabic | 10 | | 360 characters | 100% | | — |
| Ben Moussa et al. (2010) | Arabic | 10 | 500 block images | 500 block images | 96.6% | | K-nearest neighbor |
| Slimane et al. (2010) | Arabic | 10 | 100,000 word images | 100,000 word images | 99.1% | | Gaussian Model |
| Khosravi et al. (2010) | Farsi | 10 | 15,000 line images | 5,000 line images | 94.16% | | MLP |
| Bataineh et al. (2011) | Arabic | 7 | | 14 images | 43.7% | | BPNN |
| Bataineh et al. (2011) | Arabic | 7 | 420 Block images | 280 Block images | 97.85% | | Decision Tree |
| Zahedi et al. (2011) | Farsi/Arabic | 20 | 20 paragraph images | Testing: 75 images. Validation: 1400 images | 100% | | K-Nearest Neighbor |
| Pourasad et al. (2011) | Farsi | 7 | 245 images | 600 images | 93.7% | | — |
| Imani et al. (2011) | Persian | 10 | 4500 block images | 500 block images | 95% | | SVM, RBFNN, KNN |
| Bataineh et al. (2012) | Arabic | 7 | 700 images | 700 images | 98.008% | | Decision tree |

An Arabic font database is required to test method of Arabic font recognition. Therefore, databases used in Arabic and Farsi fonts identification are reviewed and presented here. Also presented here is the design and implementation of King Fahd University Arabic Font Database (KAFD). The text in the King Fahd University Arabic Font Database is collected from different subjects: history, medicine, sport, politicization . . . etc. The database consists of twenty Arabic fonts which consists of 1,181,835 text images. This database is of multi-resolution, multi-font, multi-size, and multi-style text. It consists of text at the page and line levels.

The KAFD consists of texts printed in different fonts, different sizes, weights, and slants. There are more than 450 fonts for Arabic and Farsi. This variety of fonts makes the task of font recognition more challenging. This challenge is due to the lack of a database that contains large number of fonts. So building a database that contains many fonts is important for Omni-font recognition.

Each font should consist of several sizes, weights, and slants in a benchmarking database. The reason is that most of the documents in real life may have more than one size in the same paragraph/page and may have more than one style in the same line. Therefore, the number of fonts, sizes, styles, . . . etc are important for a benchmarking database for Omni-font character recognition.

Since there is no benchmarking Arabic font database, researchers used their own datasets. These datasets are limited in the number of fonts, styles, and scanning resolutions. Such limitations in the datasets resulted in the limitations of the outcomes of the research. The KAFD database addresses this limitation by introducing a multi-font, multi-style, multi-resolution text database.

The databases used by researchers for Arabic/Farsi font identification are developed by them and are normally not available to other researchers. Moreover, some of these databases are limited in the number of fonts or the size.

The main two databases that are freely available and contain more fonts are the APTI and ALPH-REGIM databases. The details of these databases follow.

The Arabic Printed Text Image (APTI) database is a synthesized multi-font, multi-size, and multi-style database. It is a word level database where each text image consists of only one word. The APTI database was created with a lexicon of 113,284 Arabic words. It consists of 10 fonts, 10 sizes (6, 7, 8, 9, 10, 12, 14, 16, 18, and 24 points), and four styles (Plain, Bold, Italic, and combination of Bold and Italic). Its images are low resolution "72 dot/inch" and contains 45,313,600 word images. This dataset consists of six sets; five of them are available for researchers. Table 4 lists the ten fonts used in APTI database and samples of the database are shown in FIG. 7. APTI dataset was used by Slimane et al.

ALPH-REGIM database is a paragraph level database created by Ben Moussa et al. It consists of more than 5000 text images of 14 Arabic fonts with a resolution of 200 dpi, containing both printed and handwritten scripts for Arabic and Latin languages. Fourteen fonts were used with Arabic printed texts and eight with Latin texts. The fourteen Arabic fonts are listed in Table 5. FIG. 8 shows samples of ALPH-PERGIM database. In contrast to APTI database, some of the used fonts in this database are not common in Arabic documents like Ahsa and Dammam. In addition, this database lacks the ground truth of the images.

TABLE 4

| 1 | Deco Type Thuluth |
|---|---|
| 2 | Andalus |
| 3 | Deco Type Naskh |
| 4 | Arabic Transparent |
| 5 | Diwani Letter |
| 6 | Simplified Arabic |
| 7 | M Unicode Sara |
| 8 | Advertising Bold |
| 9 | Traditional Arabic |
| 10 | Tahoma |

TABLE 5

| 1 | Deco Type Thuluth |
|---|---|
| 2 | Andalus |
| 3 | Deco Type Naskh |
| 4 | Arabic Transparent |
| 5 | Diwani Letter |
| 6 | Kharj |
| 7 | Al-Hada |
| 8 | Dammam |
| 9 | Buryidah |
| 10 | Koufi |
| 11 | Badr |
| 12 | Ahsa |
| 13 | Hijaz |
| 14 | Khoubar |

Based on the overview of the available Arabic multi-font databases, the main limitations of the databases are summarized in the following:

1. The number of fonts for the available databases is limited.
2. Only one resolution is used.

3. No page level database is available.
4. The text in APTI database is identical for each font.
5. ALPH-REGIM lacks the ground truth of the text which is essential for document analysis and classification.
6. ALPH-REGIM is a single size database.
7. ALPH-REGIM does not contain different styles of each font.
8. APTI consists of synthesized text.
9. The fonts of ALPH-REGIM database are rarely used in books, magazines . . . etc.
10. The 6 and 7 point's sizes in APTI database are rarely used in Arabic documents.

The KAFD database is available in different resolutions (200 dpi, 300 dpi, and 600 dpi) and in two forms (Page and Line). The developed database consists of twenty fonts as listed in Table 6. Each font in this dataset contains unique text. For each font, ten font sizes are prepared: 8, 9, 10, 11, 12, 14, 16, 18, 20, and 24 points. For each font size, four font styles are prepared: Normal, Bold, Italic, and a combination of Bold and Italic. The KAFD database is organized into three sets: Training, Testing, and Validation sets.

TABLE 6

| 1. | AGA Kaleelah Regular (أبجد هوز) | 11. | Courier New (أبجد هوز) |
| 2. | Akhbar (أبجد هوز) | 12. | Diwani Letter (أبجد هوز) |
| 3. | Al-Qairwan (أبجد هوز) | 13. | FreeHand (أبجد هوز) |
| 4. | Al-Mohand (أبجد هوز) | 14. | M Unicode Sara (أبجد هوز) |
| 5. | Arabic Typesetting (أبجد هوز) | 15. | Microsoft Uighur |
| 6. | Arabswell (أبجد هوز) | 16. | Motken Unicode Hor (أبجدهوز) |
| 7. | Arial (أبجد هوز) | 17. | Segore UI (أبجد هوز) |
| 8. | Arial Unicode MS (أبجد هوز) | 18. | Simplified Arabic (أبجد هوز) |
| 9. | Arabic Transparent (أبجد هوز) | 19. | Times New Roman (أبجد هوز) |
| 10. | Deco Type Naskh (أبجد هوز) | 20. | Traditional Arabic (أبجد هوز) |

In order to generate the KAFD database the following five stages were conducted:—

1. Text collection
2. Printing
3. Scanning
4. Segmenting
5. Ground truth generation and validation.

In this stage, Arabic texts are collected from different subjects like Islamic, medicine, science, history . . . etc. The used texts cover all the shapes of Arabic characters. In addition, it contains Names, Quran, Places and Cities, numbers . . . etc.

The Arabic text that is used for each font in this database is different (unique) from the texts used in other fonts. In addition to that, the Training, Testing, and Validation sets are disjoint After collecting the texts, the twenty fonts were constructed as follows: —

1. The most frequent fonts in Arabic books, Magazines, Letters, Theses . . . etc. were selected
2. Each font consists of ten sizes (8, 9, 10, 11, 12, 14, 16, 18, 20, and 24 points). The sizes were selected based on the most used sizes in Books, Magazines, Letters, Theses . . . etc.
3. For each size, four font styles are used (viz. Normal, Bold, Italic, and Bold Italic). These styles are almost all the styles that are used in Arabic documents.
4. For each font style, three categories of pages are constructed (Training, Testing, and Validation sets).

5. The number of printed pages in each category is as following:—
   1. Training:
      a. Sizes (8, 9, 10, 11, 12): Between 6 pages and 13 pages based on the font size.
      b. Sizes (14, 16, 18, 20, 24): 12 pages
   2. Testing:
      a. Sizes (8, 9, 10, 11, 12): Between 2 pages and 6 pages based on the font size.
      b. Sizes (14, 16, 18, 20, 24): 4 pages
   3. Validation:
      a. Sizes (8, 9, 10, 11, 12): Between 2 pages and 6 pages based on the font size.
      b. Sizes (14, 16, 18, 20, 24): 4 pages The above sizes and styles cover the most frequently used fonts in Arabic documents, books, magazines . . . etc. FIG. 9 shows the structure of the developed Arabic fonts dataset. The database consists of three resolutions (200 dpi, 300 dpi, and 600 dpi), for each resolution, text images at the page and line levels are available.

The Arabic fonts database is printed using HP Laser jet 600 M601 Printer and with a print resolution 1200×1200 dpi. Each font consists of 14,490 printed pages as shown in Table 7.

TABLE 7

| SN | Font | Number of printed pages |
|---|---|---|
| 1 | Freehand | 728 |
| 2 | Courier New | 704 |
| 3 | Arabic Transparent | 728 |
| 4 | Al-Qairwan | 724 |
| 5 | Traditional Arabic | 721 |
| 6 | Deco Type Naskh | 735 |
| 7 | Microsoft Uighur | 699 |
| 8 | Times New Roman | 715 |
| 9 | Arial Unicode MS | 735 |
| 10 | Simplified Arabic | 738 |
| 11 | Arabic Typesetting | 716 |
| 12 | Arial | 703 |
| 13 | AGA Kaleelah | 737 |
| 14 | Al-Mohand | 721 |
| 15 | Diwani Letter | 720 |
| 16 | Segore UI | 708 |
| 17 | Arabswell | 730 |
| 18 | Motken Unicode Hor | 724 |
| 19 | M Unicode Sara | 730 |
| 20 | Tahoma | 736 |
| | Total number of printed pages | 14,452 |

As stated the previously, ten pages of size 8 in each font (6 Training, 2 Testing, and 2 Validation) are printed. The same text is used to print other sizes which resulted in the increase of the number of pages. Twenty pages (12 Training, 4 Testing, and 4 Validation) are printed for text size larger than 12 points. Therefore, the total number of printed pages is 14,452 as shown in Table 7.

The texts of Arabic fonts database are scanned using scanner at different resolutions. Scanner machine of type Ricoh IS760D is used for scanning. Pages are scanned in grayscale. They are scanned in 200 dpi, 300 dpi and 600 dpi resolutions. Each page is scanned and saved as a "tif" image file with a name that reflects the image font type, size, style, resolution, and page number (and line number for line level database). This process resulted in 43,356 page level images for all resolutions (14,452 page images per resolution). Table 8 shows the number of page images for each font size in three resolutions (200 dpi, 300 dpi, and 600 dpi).

All database pages are segmented into lines and ground truth files for each page and lines are built. Segmentation enables the researchers to use the Arabic Fonts database at the line level in addition to page level. This stage resulted in (1,138,479) line images (379,493 line images per resolution). Table 9 shows the number of line images for each font size with three resolutions (200 dpi, 300 dpi, and 600 dpi).

The truth values of the page and line images of the database (KAFD) are kept in text files. Similar names to the page and line images and their truth values are used. Table 10 shows the number of letters in each font.

TABLE 8

| S.N | Font | 08 | 09 | 10 | 11 | 12 | 14 | 16 | 18 | 20 | 24 | Total | Number of resolutions | Total |
|---|---|---|---|---|---|---|---|---|---|---|---|---|---|---|
| 1 | Freehand | 40 | 56 | 64 | 76 | 92 | 80 | 80 | 80 | 80 | 80 | 728 | 3 | 2184 |
| 2 | Courier New | 40 | 52 | 56 | 72 | 84 | 80 | 80 | 80 | 80 | 80 | 704 | 3 | 2,112 |
| 3 | Arabic Transparent | 40 | 56 | 64 | 76 | 92 | 80 | 80 | 80 | 80 | 80 | 728 | 3 | 2,184 |
| 4 | Al-Qairwan | 40 | 56 | 64 | 76 | 88 | 80 | 80 | 80 | 80 | 80 | 724 | 3 | 2,172 |
| 5 | Traditional Arabic | 44 | 55 | 63 | 75 | 84 | 80 | 80 | 80 | 80 | 80 | 721 | 3 | 2,163 |
| 6 | Deco Type Naskh | 40 | 56 | 64 | 77 | 96 | 82 | 80 | 80 | 80 | 80 | 735 | 3 | 2,205 |
| 7 | Microsoft Uighu | 40 | 53 | 57 | 72 | 78 | 79 | 80 | 80 | 80 | 80 | 699 | 3 | 2,097 |
| 8 | Times New Roman | 42 | 55 | 60 | 75 | 81 | 82 | 80 | 80 | 80 | 80 | 715 | 3 | 2,145 |
| 9 | Arial Unicode MS | 43 | 58 | 67 | 80 | 87 | 80 | 80 | 80 | 80 | 80 | 735 | 3 | 2,205 |
| 10 | Simplified Arabic | 46 | 56 | 66 | 76 | 92 | 82 | 80 | 80 | 80 | 80 | 738 | 3 | 2,214 |
| 11 | Arabic Typesetting | 40 | 56 | 60 | 76 | 84 | 80 | 80 | 80 | 80 | 80 | 716 | 3 | 2,148 |
| 12 | Arial | 40 | 53 | 60 | 70 | 80 | 80 | 80 | 80 | 80 | 80 | 703 | 3 | 2,109 |
| 13 | AGA Kaleelah | 40 | 56 | 69 | 80 | 95 | 79 | 78 | 80 | 80 | 80 | 737 | 3 | 2,211 |
| 14 | Al-Mohand | 40 | 53 | 64 | 76 | 88 | 80 | 80 | 80 | 80 | 80 | 721 | 3 | 2,163 |
| 15 | Diwani Letter | 40 | 56 | 60 | 76 | 88 | 80 | 80 | 80 | 80 | 80 | 720 | 3 | 2,160 |
| 16 | Segore UI | 42 | 52 | 60 | 72 | 82 | 80 | 80 | 80 | 80 | 80 | 708 | 3 | 2,124 |
| 17 | Arabswell | 40 | 56 | 62 | 80 | 92 | 80 | 80 | 80 | 80 | 80 | 730 | 3 | 2,190 |
| 18 | Motken Unicode Hor | 40 | 56 | 64 | 76 | 88 | 80 | 80 | 80 | 80 | 80 | 724 | 3 | 2,172 |
| 19 | M Unicode Sara | 40 | 56 | 68 | 76 | 90 | 80 | 80 | 80 | 80 | 80 | 730 | 3 | 2,190 |
| 20 | Tahoma | 46 | 56 | 66 | 78 | 90 | 80 | 80 | 80 | 80 | 80 | 736 | 3 | 2,208 |
|  | Total | 823 | 1103 | 1258 | 1515 | 1751 | 1604 | 1598 | 1600 | 1600 | 1600 | 14452 | 3 | 43,356 |

TABLE 9

| S.N | Font | 08 | 09 | 10 | 11 | 12 | 14 | 16 | 18 | 20 | 24 | Total | Number of resolutions | Total |
|---|---|---|---|---|---|---|---|---|---|---|---|---|---|---|
| 1 | Freehand | 2,212 | 2,310 | 2,352 | 2,396 | 2,481 | 1,735 | 1,492 | 1,342 | 1,176 | 1,028 | 18,524 | 3 | 55,572 |
| 2 | Courier New | 2,513 | 2,604 | 2,728 | 2,864 | 2,940 | 2,239 | 1,988 | 1,768 | 1,588 | 1,349 | 22,581 | 3 | 67,743 |
| 3 | Arabic Transparent | 2,824 | 3,024 | 3,118 | 3,214 | 3,330 | 2,318 | 1,998 | 1,760 | 1,594 | 1,360 | 24,540 | 3 | 73,620 |
| 4 | Al-Qairwan | 2,054 | 2,180 | 2,252 | 2,318 | 2,377 | 1,672 | 1,496 | 1,336 | 1,186 | 952 | 17,821 | 3 | 53,463 |
| 5 | Traditional Arabic | 1,996 | 2,034 | 2,114 | 2,140 | 2,188 | 1,658 | 1,436 | 1,304 | 1,181 | 988 | 17,039 | 3 | 51,117 |
| 6 | Deco Type Naskh | 1,578 | 1,656 | 1,704 | 1,756 | 1,812 | 1,326 | 1,120 | 960 | 876 | 712 | 13,500 | 3 | 40,500 |
| 7 | Microsoft Uighu | 1,898 | 1,930 | 2,010 | 2,091 | 2,119 | 1,642 | 1,466 | 1,301 | 1,191 | 972 | 16,620 | 3 | 49,860 |
| 8 | Times New Roman | 5,564 | 2,645 | 2,734 | 2,758 | 2,844 | 2,157 | 1,892 | 1,734 | 1,536 | 1,288 | 22,152 | 3 | 66,456 |
| 9 | Arial Unicode MS | 2,598 | 2,742 | 2,776 | 2,812 | 2,797 | 1,972 | 1,716 | 1,514 | 1,356 | 1,120 | 21,403 | 3 | 64,209 |
| 10 | Simplified Arabic | 1,886 | 1,976 | 2,026 | 2,075 | 2,132 | 1,533 | 1,339 | 1,178 | 1,096 | 881 | 16,122 | 3 | 48,366 |
| 11 | Arabic Typesetting | 2,560 | 2,768 | 2,765 | 2,742 | 2,946 | 2,140 | 1,916 | 1,710 | 1,574 | 1,281 | 22,402 | 3 | 67,206 |
| 12 | Arial | 2,467 | 2,530 | 2,664 | 2,702 | 2,791 | 2,140 | 1,906 | 1,726 | 1,524 | 1,264 | 21,714 | 3 | 65,142 |
| 13 | AGA Kaleelah | 2,120 | 2,226 | 2,282 | 2,364 | 2,507 | 1,788 | 1,515 | 1,438 | 1,272 | 1,045 | 18,557 | 3 | 55,671 |
| 14 | Al-Mohand | 2,060 | 2,181 | 2,299 | 2,369 | 2,451 | 1,755 | 1,586 | 1,438 | 1,272 | 1,045 | 18,456 | 3 | 55,368 |
| 15 | Diwani Letter | 1,602 | 1,690 | 1,738 | 1,796 | 1,854 | 1,276 | 1,112 | 1,036 | 872 | 716 | 13,692 | 3 | 41,076 |
| 16 | Segore UI | 2,238 | 2,293 | 2,383 | 2,458 | 2,550 | 1,970 | 1,728 | 1,563 | 1,418 | 1,191 | 19,792 | 3 | 59,376 |
| 17 | Arabswell | 1,806 | 1,906 | 1,926 | 1,988 | 2,062 | 1,432 | 1,270 | 1,108 | 1,020 | 872 | 15,390 | 3 | 46,170 |
| 18 | Motken Unicode Hor | 2,134 | 2,216 | 2,262 | 2,315 | 2,342 | 1,696 | 1,480 | 1,340 | 1,156 | 1,014 | 17,955 | 3 | 53,865 |
| 19 | M Unicode Sara | 2,170 | 2,300 | 2,352 | 2,410 | 2,492 | 1,764 | 1,520 | 1,342 | 1,190 | 1,036 | 18,576 | 3 | 55,728 |
| 20 | Tahoma | 2,682 | 2,750 | 2,832 | 2,918 | 3,056 | 2,150 | 1,826 | 1,670 | 1,504 | 1,269 | 22,657 | 3 | 67,971 |
|  | Total | 43,960 | 45,961 | 47,317 | 48,486 | 50,071 | 36,363 | 31,802 | 28,568 | 25,582 | 21,383 | 379,493 | 3 | 1,138,479 |

TABLE 10

| Hamza | Alif | Hamza-Under-Alif | Hmaza-Above-Alif | Tild-Above-Alif | Baa | Taaa-Closed | Taaa | Thaa | Jiim | Haaa | Xaa | Daal | Thaal | Taa | Zaay | Siin | Shiin |
|---|---|---|---|---|---|---|---|---|---|---|---|---|---|---|---|---|---|
| 7648 | 317688 | 20568 | 52160 | 3400 | 70332 | 56164 | 69720 | 20320 | 25436 | 47016 | 15648 | 56596 | 26596 | 74336 | 6276 | 62232 | 12768 |
| 4928 | 241312 | 14600 | 30792 | 2264 | 53240 | 52264 | 69864 | 10488 | 20832 | 25816 | 12904 | 41024 | 12784 | 71480 | 7920 | 35376 | 14776 |
| 8268 | 510004 | 31452 | 52364 | 2444 | 108084 | 121856 | 167348 | 17928 | 53856 | 47640 | 23096 | 97548 | 20104 | 128332 | 14248 | 67936 | 24292 |
| 8256 | 402596 | 22696 | 49004 | 1900 | 72264 | 92012 | 125824 | 15636 | 40968 | 38524 | 21564 | 75392 | 19736 | 90652 | 9768 | 52016 | 19076 |
| 6776 | 365412 | 19488 | 49612 | 1944 | 78848 | 67440 | 111924 | 17696 | 33484 | 41796 | 19188 | 74812 | 19188 | 103096 | 13692 | 46232 | 20796 |
| 11326 | 285420 | 19602 | 59162 | 1870 | 93848 | 45996 | 51092 | 15188 | 32278 | 40902 | 23904 | 56944 | 26916 | 111670 | 13546 | 54584 | 23530 |
| 11928 | 490890 | 25224 | 66556 | 3084 | 121890 | 97502 | 139762 | 19762 | 50126 | 64296 | 21080 | 83234 | 26434 | 161686 | 20242 | 69012 | 24078 |
| 6752 | 427868 | 21984 | 50936 | 2292 | 85452 | 93164 | 133968 | 22648 | 38216 | 49372 | 19704 | 77204 | 19464 | 119124 | 16212 | 55056 | 24704 |
| 8516 | 383612 | 20580 | 55308 | 2172 | 73304 | 81812 | 121148 | 14444 | 33512 | 36092 | 29428 | 73772 | 23776 | 94136 | 9360 | 42852 | 18676 |
| 7096 | 295316 | 13480 | 35644 | 1788 | 67468 | 54552 | 94352 | 14280 | 28500 | 33948 | 14976 | 57420 | 15652 | 86572 | 12664 | 39776 | 15672 |
| 13264 | 680170 | 29282 | 62556 | 2600 | 131806 | 128106 | 191078 | 31540 | 54906 | 76154 | 36196 | 110030 | 24716 | 198020 | 35782 | 82384 | 42252 |
| 10884 | 372124 | 21628 | 61496 | 2960 | 102256 | 57248 | 89348 | 17408 | 32616 | 39076 | 29140 | 69836 | 24848 | 124812 | 9168 | 53660 | 19288 |
| 9496 | 376476 | 26112 | 64912 | 2792 | 115036 | 46344 | 80464 | 16464 | 26512 | 44620 | 22000 | 69260 | 30548 | 99596 | 11024 | 53340 | 20496 |
| 6464 | 377940 | 25980 | 44244 | 1456 | 63128 | 88800 | 134892 | 13436 | 42824 | 36388 | 25032 | 72712 | 21232 | 71460 | 8604 | 46904 | 17168 |
| 14464 | 328208 | 26844 | 58300 | 1224 | 96004 | 56696 | 77888 | 17380 | 35756 | 42016 | 23840 | 63844 | 29072 | 110996 | 13136 | 60504 | 26228 |
| 6648 | 338976 | 18828 | 45396 | 1864 | 74252 | 66152 | 95116 | 14780 | 32956 | 37228 | 22280 | 59216 | 16908 | 99468 | 11012 | 46980 | 19088 |
| 9096 | 279372 | 15564 | 31252 | 1548 | 54716 | 72772 | 90612 | 12520 | 22928 | 34292 | 14016 | 55424 | 14084 | 71080 | 13448 | 53340 | 14272 |
| 10790 | 320592 | 23908 | 70426 | 2454 | 83764 | 40932 | 105090 | 12048 | 39274 | 52340 | 19268 | 60448 | 26070 | 101000 | 13266 | 50172 | 22540 |
| 13704 | 325488 | 31608 | 71840 | 4960 | 96916 | 36712 | 81176 | 15704 | 40644 | 37472 | 24088 | 60248 | 34756 | 105912 | 18800 | 45640 | 24584 |
| 5312 | 310712 | 14276 | 39876 | 1456 | 66712 | 57700 | 93976 | 13340 | 27612 | 39088 | 15996 | 61216 | 18440 | 84236 | 11344 | 43852 | 16764 |
| 181,616 | 7,430,176 | 443,704 | 1,051,836 | 46,472 | 1,709,316 | 1,414,224 | 2,124,642 | 337,752 | 715,236 | 864,076 | 433,348 | 1,378,180 | 451,324 | 2,107,664 | 269,512 | 1,039,736 | 421,048 |

| Saad | Daad | Thaaa | Taa | Ayn | Ghayn | Faa | Gaaf | Kaaf | Laam | Miim | Nuun | Haa | Waaw | Yaa | Alif-Broken | Hamza-Above-Waaw | Hamza-Above-Alif Broken |
|---|---|---|---|---|---|---|---|---|---|---|---|---|---|---|---|---|---|
| 17164 | 10720 | 11316 | 7964 | 70284 | 7696 | 78888 | 44524 | 53920 | 267244 | 121464 | 166256 | 82824 | 124088 | 149076 | 20264 | 2548 | 11888 |
| 13696 | 8848 | 13848 | 4272 | 58856 | 7328 | 42208 | 34056 | 32168 | 189696 | 101568 | 88504 | 45792 | 86704 | 115720 | 14808 | 1296 | 4456 |
| 29568 | 18992 | 38592 | 5564 | 137040 | 8068 | 73116 | 67664 | 42156 | 392080 | 204296 | 121932 | 76240 | 159952 | 223172 | 27064 | 3540 | 16780 |
| 22736 | 12384 | 26080 | 6220 | 118136 | 4760 | 70272 | 62252 | 39980 | 318972 | 178048 | 111108 | 69568 | 134484 | 186428 | 22676 | 5328 | 12228 |
| 22820 | 12976 | 23036 | 5892 | 86484 | 11104 | 63432 | 53624 | 49436 | 287040 | 153964 | 119560 | 74780 | 127980 | 171360 | 22604 | 3448 | 9844 |
| 23416 | 17540 | 24480 | 2922 | 58118 | 13536 | 62850 | 54948 | 31646 | 230184 | 114718 | 119186 | 89012 | 150324 | 150558 | 12456 | 2886 | 4466 |
| 25802 | 23992 | 32196 | 8146 | 108278 | 17954 | 84166 | 65378 | 58402 | 364070 | 190952 | 161922 | 117794 | 189126 | 231760 | 30792 | 1958 | 11308 |
| 24628 | 14444 | 29324 | 6508 | 85424 | 11588 | 67320 | 53768 | 51392 | 322004 | 169496 | 126156 | 78524 | 139584 | 188584 | 25664 | 2312 | 9992 |
| 23184 | 17668 | 33564 | 6220 | 98528 | 8944 | 69244 | 48612 | 41244 | 322904 | 157404 | 110068 | 60796 | 120800 | 163404 | 26844 | 2728 | 10468 |
| 16316 | 10980 | 23640 | 4780 | 63640 | 8652 | 51484 | 40248 | 39620 | 219884 | 120716 | 97288 | 57748 | 111028 | 130880 | 19420 | 1952 | 6152 |
| 35510 | 32128 | 45402 | 8770 | 123246 | 33682 | 96038 | 66412 | 80990 | 472110 | 215294 | 188554 | 93848 | 221052 | 291330 | 34570 | 6738 | 25942 |
| 23164 | 13024 | 17552 | 5592 | 90200 | 8984 | 68816 | 46560 | 52796 | 279032 | 153336 | 143336 | 97932 | 149424 | 165232 | 23756 | 3360 | 7000 |
| 24420 | 16052 | 17356 | 6124 | 100720 | 14456 | 82364 | 50532 | 60156 | 318904 | 196188 | 156544 | 133636 | 175680 | 154988 | 26544 | 2636 | 12508 |
| 23512 | 12544 | 19792 | 7008 | 101796 | 5020 | 58444 | 51304 | 36256 | 273060 | 177316 | 134500 | 64016 | 114192 | 192104 | 5400 | 5360 | 8576 |
| 23748 | 17916 | 23732 | 4584 | 74644 | 6136 | 80444 | 56656 | 51928 | 282112 | 147804 | 124848 | 108728 | 159140 | 171176 | 19792 | 1968 | 5400 |
| 22872 | 12296 | 17768 | 5156 | 75876 | 11136 | 58716 | 43424 | 43276 | 262292 | 144296 | 124848 | 71580 | 131260 | 164264 | 20612 | 2800 | 7076 |
| 16160 | 10128 | 25436 | 5000 | 85424 | 7908 | 51584 | 37340 | 33848 | 205228 | 102984 | 81352 | 40200 | 90076 | 129552 | 14452 | 1952 | 7960 |
| 24046 | 14598 | 18792 | 9254 | 85952 | 10240 | 78174 | 56686 | 64654 | 274908 | 147502 | 132630 | 91864 | 130072 | 152546 | 23024 | 4020 | 8204 |
| 21840 | 14120 | 18352 | 6808 | 81116 | 16240 | 89896 | 60372 | 61600 | 287992 | 156724 | 149464 | 123180 | 135484 | 170720 | 27872 | 1568 | 6496 |
| 19680 | 13460 | 19024 | 5632 | 66664 | 9776 | 49608 | 42268 | 45028 | 230900 | 124916 | 109988 | 59188 | 123728 | 139100 | 20116 | 2196 | 6688 |
| 454,282 | 304,810 | 479,282 | 122,416 | 1,737,314 | 233,134 | 1,377,064 | 1,036,638 | 970,496 | 5,800,618 | 3,078,986 | 2,538,808 | 1,637,250 | 2,774,178 | 3,441,954 | 438,730 | 60,594 | 193,432 |

The statistics of the KAFD database follow below.

Arabic font database consists of 43,356 page images. Page-level database is presented in three resolutions (200 dpi, 300 dpi, and 600 dpi), 20 fonts (Table 6), 10 sizes (8, 9, 10, 11, 12, 14, 16, 18, 20, and 24 points) and 4 styles (Normal, Bold, Italic, and combination of Bold and Italic). Table 9 shows the number of page images for each font. Table 10 shows the total number of pages, lines, words, and characters of KAFD database. FIG. 10 shows a page level image of KAFD database.

TABLE 10

|  | Number of page images | Number of line images | Number of characters |
|---|---|---|---|
|  | 14,452 | 379,493 | 49,099,848 |
| Number of resolutions | 3 | 3 | 3 |
| Total | 43,356 | 1,138,479 | 147,299,544 |

Arabic font database consists of (1,138,479) line images. This part of the database is presented in three resolutions (200 dpi, 300 dpi, and 600 dpi), 20 fonts (Table 6), 10 sizes (8, 9, 10, 11, 12, 14, 16, 18, 20, and 24 points) and 4 styles (Normal, Bold, Italic, and combination of Bold and Italic). Table 9 shows the number of line images for each font. Table 10 shows the total number of pages, lines, words, and characters of KAFD database. FIG. 11 shows samples of line level images of KAFD database.

APTI database is used for comparison with KAFD database. The APTI database is a word level database consisting of 10 fonts, 10 sizes, and 4 font-styles. Table 11 shows a comparison between the two databases. APTI database consists of only 10 fonts while KAFD database consists of 20 fonts. APTI has one resolution (72 dpi), whereas Arabic font database is scanned with three resolutions (200 dpi, 300 dpi, and 600 dpi). APTI is available only at the word level while KAFD database is available in two forms (page and line). The number of APTI images is greater than KAFD database because it is a word images while KAFD database is page and line images. Finally, APTI text images contain synthesized text, whereas KAFD database is scanned real text.

TABLE 11

| Evaluation criteria | KAFD | APTI |
|---|---|---|
| Number of fonts | 20 | 10 |
| Number of sizes | 10 | 10 |
| Number of styles | 4 | 4 |
| Resolutions | 200 dpi - 300 dpi - 600 dpi | 72 dpi |
| Database levels | Page - Line | Word |
| Total number of images | 1,181,835 (Page and line images) | 45,313,600 (Word images) |
| Number of characters | 147,299,544 | 259,312,000 |
| Scanning method | Scanner | Synthesized |

The lack of a benchmarking multi-font Arabic database makes the task of developing Arabic font and text recognition more difficult. Furthermore, comparing the accuracy of the techniques developed by researchers without a benchmarking database is in-appropriate. A review of the multi-font Arabic databases is presented. Then, a description of the database (viz. KAFD) is presented. KAFD is a free database available for researchers in three resolutions (200 dpi, 300 dpi, and 600 dpi) and two levels (page-level and line-level). It is a multi-font, multi-size, and multi-style database. It consists of 20 fonts, 10 sizes, and 4 font-styles. Moreover, it is available at the page and line levels and consists of (1,181,835) text images.

SUMMARY OF THE INVENTION

According to one embodiment of the present invention, there is provided a method of font recognition comprising: calculating values of various font features for a sample text, wherein the feature values correspond to various aspects of the font, and the font features include the curvature features for the sample text. Next, the method includes determining a Euclidian distance between the font feature values for the sample text and respective model feature values for each predefined font. The Euclidian distance for the $i^{th}$ predefined font is given by $$D_i = \sqrt{\sum_{j=1}^{n} (T_{ij} - V_j)^2},$$

where n is the number of feature values, $T_{ij}$ is an element corresponding to the $i^{th}$ row and $j^{th}$ column of a matrix of the model values, and $V_j$ is a $j^{th}$ element a vector containing the plurality of the feature values for the sample text. Finally, the method includes signaling that the font of the sample text is the font from the predefined fonts corresponding to the smallest Euclidian distance.

According to one aspect of the present invention, the font features include the center of gravity features of the sample text.

According to one aspect of the present invention, the font features include log baseline features, baseline vertical features, number of vertical extrema features, a number of black components, and a number of white components.

According to one aspect of the present invention, the font features include chain code direction features.

According to one aspect of the present invention, the font features include direction length features.

According to one aspect of the present invention, the font features include concave curvature features and convex curvature features.

According to one aspect of the present invention, the font features include a smallest black component feature.

According to one aspect of the present invention, the method includes preprocessing the sample text before calculating the plurality of feature values for the sample text, wherein the preprocessing includes normalizing the height and width of the sample text.

According to one embodiment of the present invention, there is provided a method of font recognition comprising: calculating values of various font features for a sample text, wherein the feature values correspond to various aspects of the font, and the font features include Log-Gabor orientation-scale-variance features and Log-Gabor orientation-scale-mean features for the sample text. Next, the method includes determining a Euclidian distance between the font feature values for the sample text and respective model feature values for each predefined font. The Euclidian distance for the $i^{th}$ predefined font is given by $$D_i = \sqrt{\sum_{j=1}^{n} (T_{ij} - V_j)^2},$$

where n is the number of feature values, $T_{ij}$ is an element corresponding to the $i^{th}$ row and $j^{th}$ column of a matrix of the model values, and $V_j$ is a $j^{th}$ element a vector containing the plurality of the feature values for the sample text. Finally, the method includes signaling that the font of the sample text is the font from the predefined fonts corresponding to the smallest Euclidian distance.

According to one aspect of the present invention, the method includes that the sample text is subdivided into nine segments on a three by three grid; and the Log-Gabor orientation-scale-variance features and the Log-Gabor orientation-scale-mean features are calculated for each segment of the three by three grid.

In other embodiments of the invention the methods are implemented in the processor of a computer and/or a computer system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3(a) shows the Laplacian filter value;

FIG. 3(b) shows an image of Arabic text without filtering;

FIG. 3(c) shows an image of Arabic text with Laplacian filtering;

FIG. 3(d) shows an image of Arabic text with Laplacian filtering and inversion filtering;

FIG. 5(a) shows the nomenclature for the eight neighboring pixels;

FIG. 5(b) shows the edge direction matrix (EDM) of the values of the cells;

FIG. 7 shows APTI font samples with their font family;

FIG. 8 shows ALPH-REGIM database samples;

FIG. 10 shows a page level image of KAFD database (Deco Type Thulth font);

FIG. 12 shows a sample of multi-font Arabic text.

FIG. 18(a) shows extracting the center of gravity features from a window of text;

FIG. 18(b) shows extracting the center of gravity features from a window of text;

FIG. 23 (b) shows the convex features;

FIG. 25(a) shows the real part of Gabor transform image;

FIG. 25 (b) shows the imaginary part of Gabor transform image;

FIG. 26 shows the similarity between 4 fonts; and

DETAILED DESCRIPTION OF THE PREFERRED EMBODIMENTS

Figure 1:
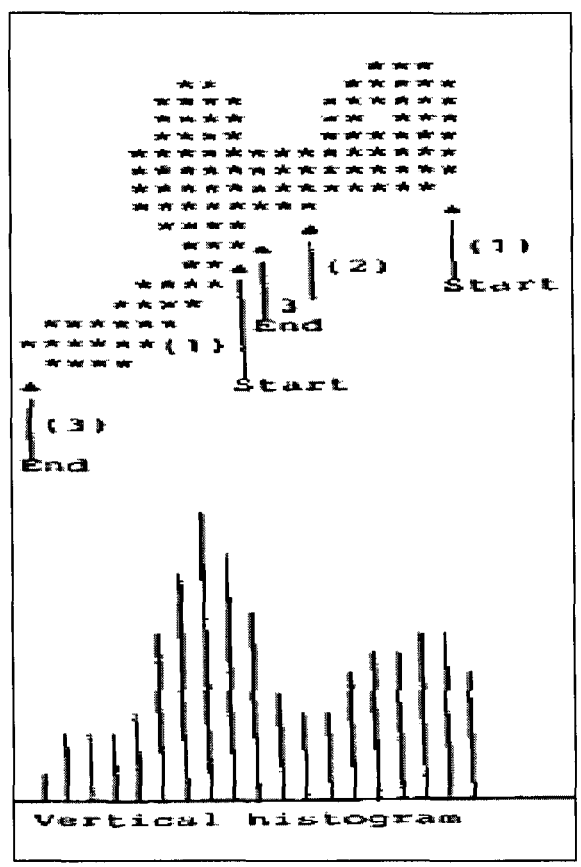
FIG. 1 shows the definitions of the start and end points for ands characters.
Figure 2:
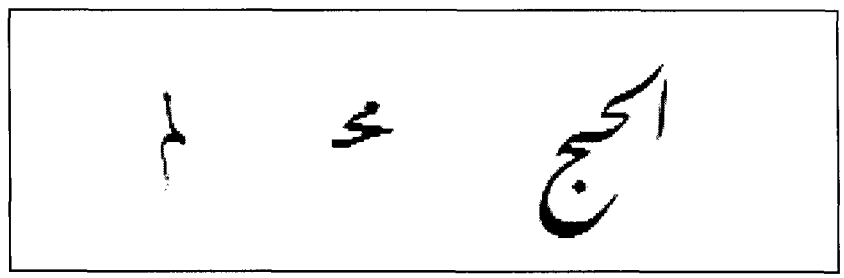
FIG. 2 shows examples of ligature characters.
Figure 4:
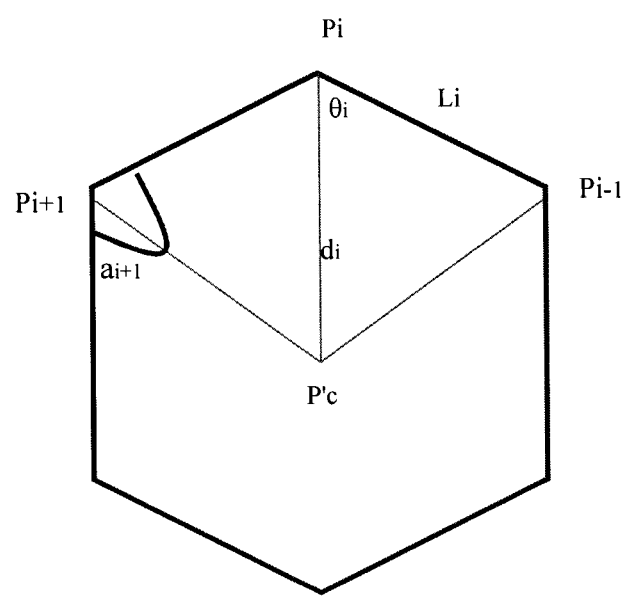
FIG. 4 shows the shape index.
Figure 6:
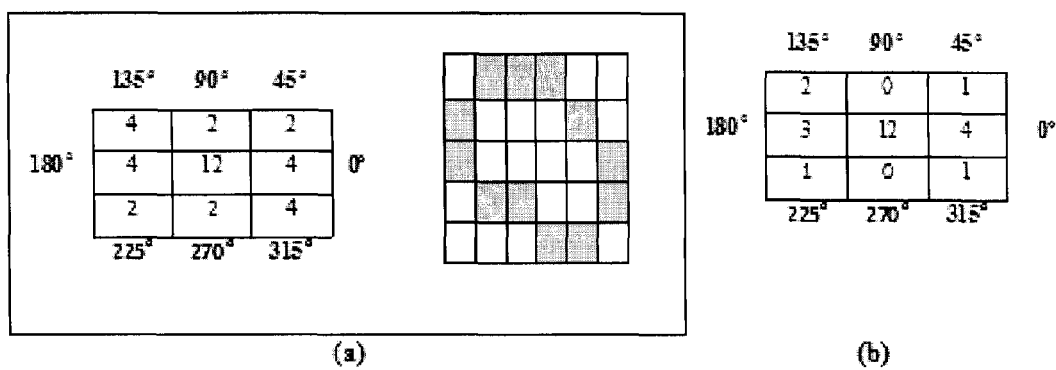
FIG. 6(a) shows a sample edge image and the EDM1 values
FIG. 6(b) shows the EDM2 values.
Figure 9:
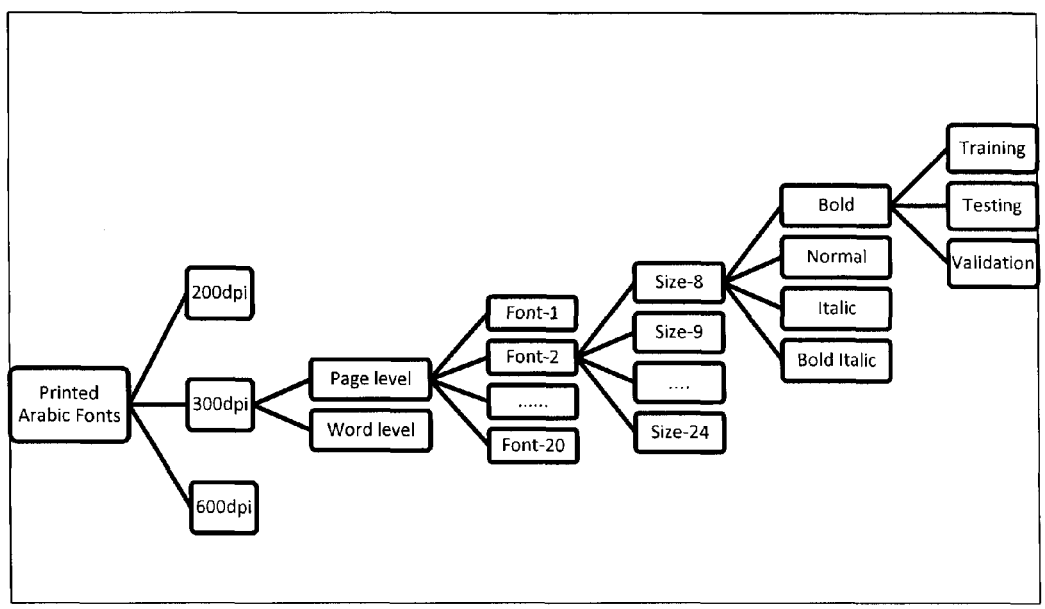
FIG. 9 shows a diagram of the KAFD structure tree.
Figure 11:
FIG. 11 shows a samples of line level images of KAFD database.
Figure 13:
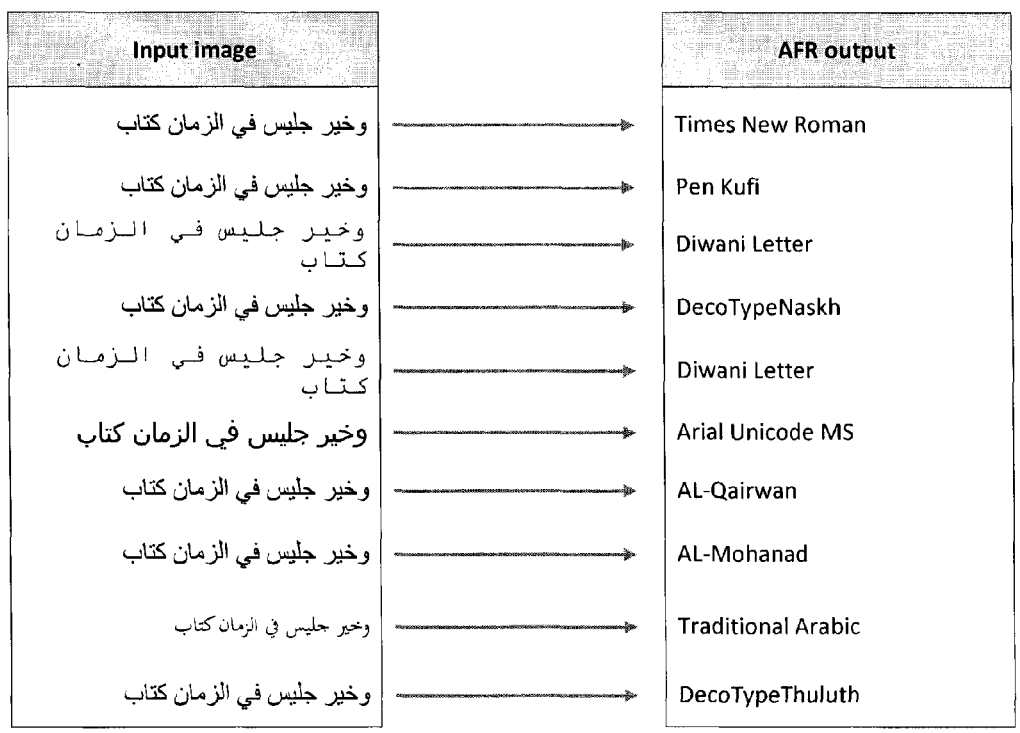
FIG. 13 shows an example of AFR output.

Referring now to the drawings, wherein like reference numerals designate identical or corresponding parts throughout the several views, FIG. 12 shows a simple printed Arabic page with multi-font text. FIG. 13 shows the expected output of AFR.

Arabic font recognition is the process of recognizing the font of a given text image. In one embodiment, it may be a preprocessing phase to an Optical Character Recognition (OCR) system which enables the identification of the font of text and then use the pre-trained models of the specific font for the text image. Arabic font recognition has not been studied as extensively as OCR despite its importance in improving recognition accuracy.

Using the KAFD database, a multi-resolution database is built, which includes 20 Arabic fonts in 3 resolutions, 10 sizes, and 4 styles. Six hundred and thirty features are extracted. Fifty four features are classical features (viz. Curvature features (Concave and convex features), Direction features, Direction length features, Box Counting Dimension (BCD) features, Center of gravity features, Number of vertical and horizontal extrema features, Number of black and white components features, Smallest black component features, and Log baseline position features). Five hundred and seventy six features are extracted using Log-Gabor features with 8 orientations and 4 scales. The accuracy computed of each feature independently and in a combination with other features is compared. Experimental results of applying these features on Arabic fonts are presented. The accuracy of these features using a freely available database and the KAFD database compared favorably with the state of art as discussed here.

Arabic font recognition (AFR) is one of the Pattern Recognition problems that can be viewed as an independent problem. This problem is associated with Arabic Text Recognition (ATR). Determining the font of the characters before text recognition is useful. By identifying the typeface of the font, the appropriate model of the specific font of ATR which results in higher ATR accuracy and reduced recognition time can be used.

Several types of features are extracted for Arabic font recognition. Some features are modified for Arabic font recognition (viz. Curvature features, Direction and Direction length features). Other features are implemented for investigating the possibility of using them in combination with other features (viz. Box Counting Dimension (BCD), Center of gravity, Number of vertical and horizontal extrema, Log-baseline position, Log-Gabor features). Several experiments are conducted to choose the best combination of features and to compare the Arabic font recognition technique with other published work. This resulted in grouping of similar fonts which resulted in improving identification rates.

Arabic font recognition is realized by extracting several types of features for Arabic fonts recognition. Some features are classical features that are modified for Arabic fonts recognition like Curvature features, Direction and Direction length features. In addition, other features are implemented for investigating the possibility of using them with other features, like Box Counting Dimension (BCD), Center of gravity, Number of vertical and horizontal extrema, Log-Gabor features . . . etc. These features are described in detail.

TABLE 12

| S.N | Feature | Number of features |
|---|---|---|
| 1 | Concave curvature | 10 |
| 2 | Convex curvature | 10 |
| 3 | Direction | 8 |
| 4 | Direction length | 8 |
| 5 | Box Counting Dimension | 1 |
| 6 | Center of gravity | 10 |
| 7 | Number of vertical and horizontal extrema | 2 |
| 8 | Number of black and white components | 2 |
| 9 | Smallest black component | 1 |
| 10 | Log baseline position | 2 |
| 11 | Log-Gabor | 576 |
| | Total number of features | 630 |

A total of 630 features are considered for Arabic font recognition. Of these 630 features there are 36 classical features that were modified for Arabic fonts recognition (viz. concave and convex curvature features, direction, and direction length features). Of these 630 features there are 18 features implemented from published work (viz. Box Counting Dimension (BCD), Center of gravity, Number of vertical and horizontal extrema, Number of black and white components, Smallest black component, and Log baseline position). Finally there are 576 features extracted using Log-Gabor features with 8 orientations and 4 scales. For the Log-Gabor features, the text image is divided into 3×3 segments and the mean and variance features are extracted for each segment. This resulted in 576 features (8×4×3×3×2=576). Table 12 shows the used features and the dimension of each feature.

Figure 14:
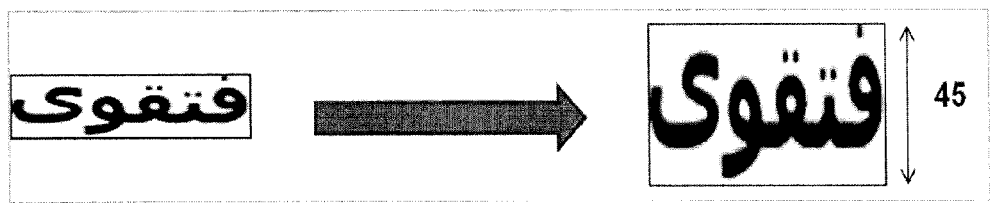
FIG. 14 shows an example of Image normalization.

Before extracting features, preprocessing is required. Here, the preprocessing will be discussed before the discussion of feature extraction. The first step in the preprocessing stage is to normalize the image to 45 pixels height and maintained the aspect ratio. Normalizing both the width and height affects the shape of the image contents. See S. Mahmoud, "Arabic (Indian) handwritten digits recognition using Gabor-based features," In International Conference on Innovations in Information Technology (ITT 2008), vol. 88, no. 4, pp. 683-687, 2008, incorporated herein by reference in its entirety. Normalization process is shown FIG. 14.

Figure 15:
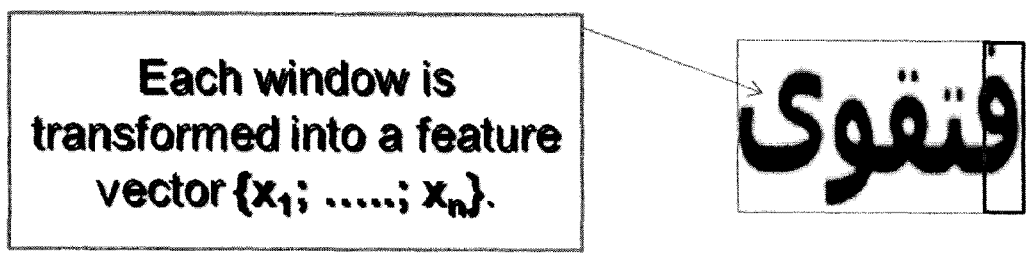
FIG. 15 shows the extracting of a feature vector from a window of text.
Figure 16:
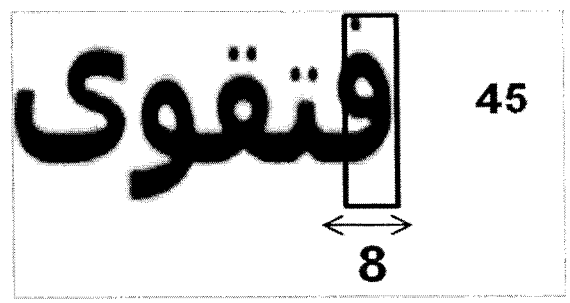
FIG. 16 shows the window setup for extracting features.

After normalizing the image into 45 pixels height, a window is built of 45 pixels height and 8 pixels width as shown in FIG. 15. The purpose of this window is to extract the features (i.e., Number of black components, Number of white components, Center of Gravity, Number of vertical extrema, Number of horizontal extrema, Smallest black component, Log baseline position, Box counting dimension, Direction, Direction length, Concave Curvature, and Convex Curvature) by shifting the window over the image by one pixel. Each window is transformed into a vector of features as shown in FIG. 16.

The following features are extracted and used to identify Arabic fonts.

Figure 17:
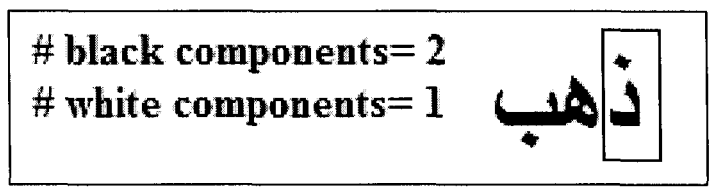
FIG. 17 shows extracting the number of black and white components as an example of extracting font features from a window of text.

The feature of the "Number of Black Components" returns the number of the black components in the window as shown in FIG. 17.

The feature of the "Number of White Components" returns the number of the white components in the window as shown in FIG. 17.

To extract the "Center of Gravity," the window is divided into five parts 3 horizontally and 2 vertically, then the center of gravity vertically and horizontally for each part is computed horizontally and vertically. This results in ten features as shown in FIG. 18.

Figure 19:
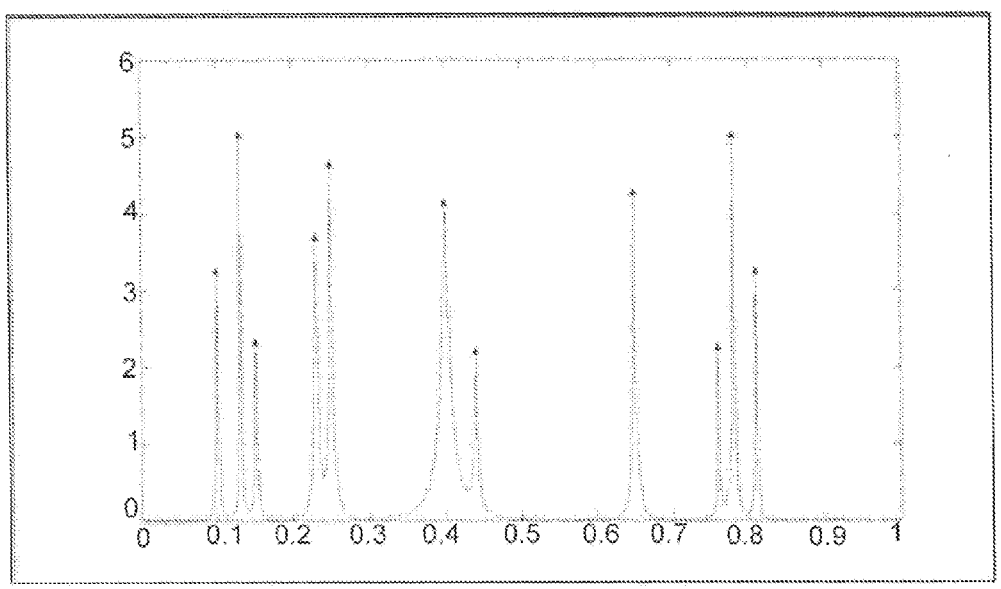
FIG. 19 shows the vertical projection peaks from a window of text.

The feature of the "Number of Vertical Extrema" returns the number of peaks for each window of the vertical projection. FIG. 19 shows 11 peaks.

Figure 20:
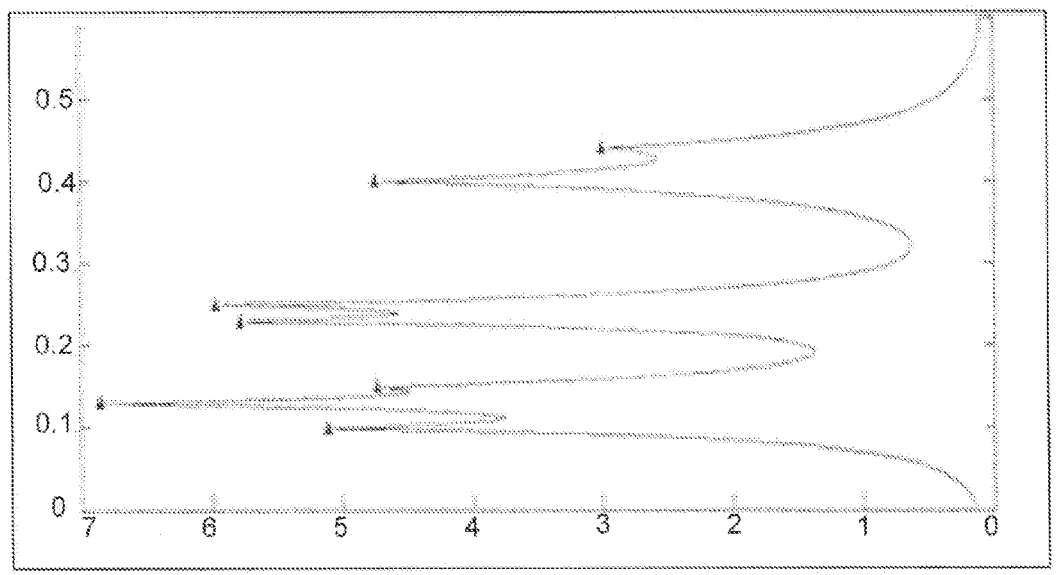
FIG. 20 shows the horizontal projection peaks from a window of text.

The feature of the "Number of Horizontal Extrema" returns the number of peaks for each window of the horizontal projection. FIG. 20 shows 7 horizontal peaks.

Figure 21:
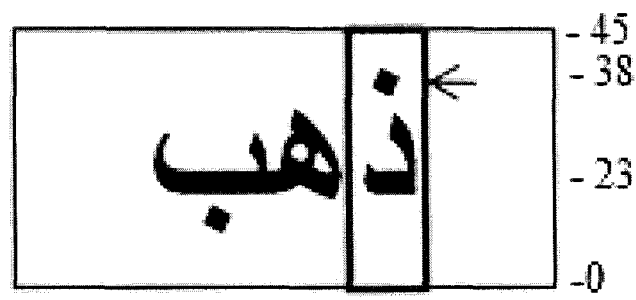
FIG. 21 shows extracting the position of smallest black component from a window of text.

The feature of the "Smallest Black Component" returns the relative vertical position of the smallest black component as shown in FIG. 21. It returns 38 as the vertical position of the smallest black component, the dot, as the number of pixels is 38 from the bottom.

The feature of the "Log Baseline Position" returns two values: the log of the estimated baseline position and the relative vertical position of baseline.

Figure 22:
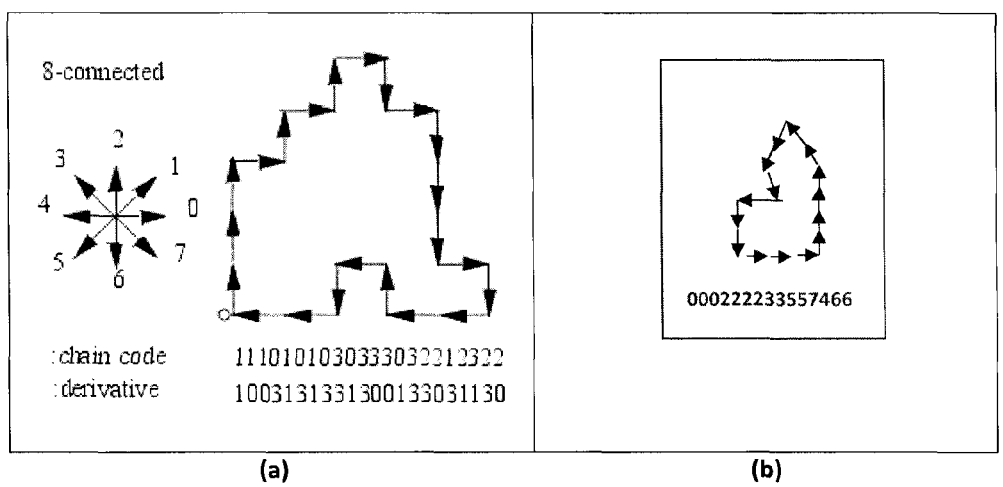
FIG. 22 shows the chain code features.

The feature of the "Direction" returns the number of chain codes in each direction of the contour of the character primary part in the window divided by the total number of chain codes in all directions. It returns eight features corresponding to the 8 chain codes. The chain codes are shown in FIG. 22(a). The extracted features for character 'Daal' are {0.2, 0, 0.26, 0.2, 0.06, 0.13, 0.13, 0.06, 0} that represents the number of chain codes in {0, 1, 2, 3, 4, 5, 6, 7} directions, respectively, divided by the total number of chain codes in all directions as shown in FIG. 22(b).

The feature of the "Direction Length" is determined from a series of shorter segments of chain codes. The direction lengths are obtained based on the number of chain codes in each direction where even number have a length of one and odd have a length of $\sqrt{2}$. The eight direction length features are then divided by the total contour length.

Figure 23:
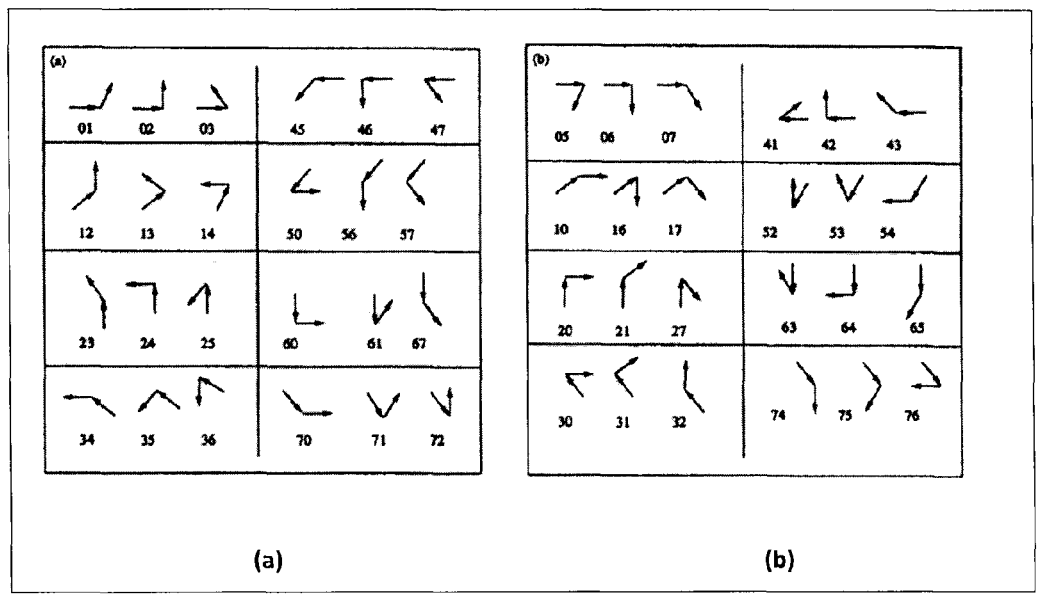
FIG. 23 (a) shows the concave features.

A curvature is a "Concave Curvature" if the external angle between two successive direction codes is between 0 and 180 deg. There are two concave features' types based on the starting of the chain code (begins with an odd or even chain code as shown in FIG. 23(a)). The window is divided into four parts, then eight concave features from all the quadrants are retrieved. Ten features are extracted, two from the overall window and eight from the window quadrants.

A curvature is a "Convex Curvature" if the external angle between two successive direction codes is greater than 180 deg. There are two convex features' types based on the starting of the chain code (begins with odd or even chain code) as shown in FIG. 23(b). The window is then divided into four parts. Ten features are extracted, two from the overall window and eight from the window quadrants.

Figure 24:
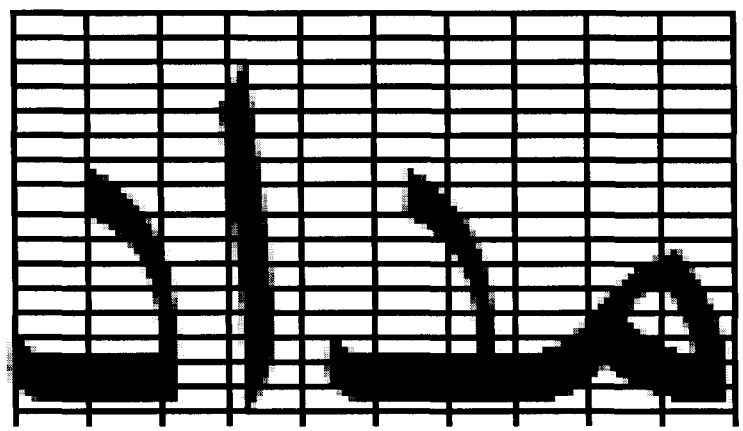
FIG. 24 shows the Box counting Dimension feature.

The feature of the "Box Counting Dimension" (BCD) is used to cover the aspects in two dimensional image (window) as shown in FIG. 24. With BCD, the window is divided into a set of boxes of size (20 pixels). Then, the total number of boxes that are not empty (contain texts) are counted and used as a feature.

Gabor filters have been used extensively in image processing and texture analysis. The advantage of Gabor filters arise from: (1) Their ability to simulate the receptive fields of simple cells in visual cortex; (2) They work well for minimizing the joint two dimensional uncertainty in spatial and frequency that is suited for segmentation problems, (3) They are robust against noises since it works directly on gray level images. See X. Wang, X. Ding, and C. Liu, "Gabor filters-based feature extraction for character recognition," Pattern Recognition, vol. 38, no. 3, pp. 369-379, 2005; J. Daugman, "Uncertainty relation for resolution in space, spatial frequency, and orientation optimized by two-dimensional visual cortical filters," Optical Society of America, Journal, A:

Optics and Image Science, vol. 2, no. 7, pp. 1160-1169, 1985; Hamamoto, Y., Uchimura, S., Watanabe, M., Yasuda, T., Mitani, Y., & Tomita, S., "A Gabor filter-based method for recognizing handwritten numbers," Pattern Recognition, vol. 31, no 4, pp. 395-400, 1998; and Jain, A. K., & Farrokhnia, F., "Unsupervised texture segmentation using Gabor filters," *Pattern recognition*, vol. 24, no 12, pp. 1167-1186, 1990, each incorporated herein by reference in their entirety.

Gabor filters have been used in many applications such as image representation, edge detection, texture segmentation, retina identification, and fractal dimension management. See T. P. Weldon and W. E. Higgins, "Design of multiple Gabor filters for texture segmentation," 1996 IEEE International Conference on Acoustics, Speech, and Signal Processing Conference Proceedings, vol. 4, no. 4, pp. 2243-2246, 1996, incorporated herein by reference in its entirety.

FIG. 25 shows the real and imaginary parts of a word image using Log-Gabor with 8 orientations and 4 scales. A two dimensional Gabor filter is a complex sinusoidal plane modulated by a Gaussian function in space domain. Complex Gabor filter has real (even) and imaginary (odd) components representing orthognal direction in 2-D spatial domain. See Karlheinz Gröchenig, "*Foundation of time-frequency analysis*." Birkhauser, 2001; and S. A. Mahmoud and W. G. Al-Khatib, "Recognition of Arabic (Indian) bank check digits using log-gabor filters," Applied Intelligence, pp. 1-12, May 2010, each incorporated herein by reference in their entirety.

The even and odd Gabor filters in the 2-dimensional spatial domain can be formaled as:

$$g_e(x, y; \lambda, \theta) = e^{-\frac{1}{2}\left(\frac{x^2}{\sigma_x^2} + \frac{y^2}{\sigma_y^2}\right)} \cos\left(2\pi \frac{x}{y}\right)$$

and $$g_o(x, y; \lambda, \theta) = e^{-\frac{1}{2}\left(\frac{x^2}{\sigma_x^2} + \frac{y^2}{\sigma_y^2}\right)} \sin\left(2\pi \frac{x}{y}\right),$$

where $\lambda$ is the Gabor filter wavelength, $\theta$ is the rotation angle of the Gaussian major axes and the plane wave, $\sigma_x$ and $\sigma_y$ define the spread of the Gaussian window which control the bandwidth of the filter ($\sigma_x = \lambda_x$ and $\sigma_y = \lambda_y$). The filter orientations are calculated using $$\theta_k = \frac{2\pi k}{n}, k = \{0, 1, \ldots, n-1\},$$

where n is the number of used orientations. The responses of the filters $g_e$ and $g_o$ to an image $i(x,y)$ can be calculated with the convolution $$G_e(x,y;\lambda,\theta) = g_e(x,y;\lambda,\theta) * i(x,y),$$

$$G_o(x,y;\lambda,\theta) = g_o(x,y;\lambda,\theta) * i(x,y), \text{ and}$$

$$G_a(x,y;\lambda,\theta) = \sqrt{G_e^2(x,y;\lambda,\theta) + G_o^2(x,y;\lambda,\theta)},$$

where $G_e$ is the even response of the filter, $G_o$ is the odd response of the filter, and $G_a$ is the amplitude response of the even and odd responses. To speed up the computation, the filter can be implemented in the frequency domain to reduce the computation time. See, S. A. Mahmoud and W. G. Al-Khatib, "Recognition of Arabic (Indian) bank check digits using log-gabor filters," Applied Intelligence, pp. 1-12, May 2010, incorporated herein by reference in their entirety. The fourier transforms of the image and filter are computed using Fast Fourier Transform (FFT) and then maniplulated according to Fourier transform of the filtered Image=FFT(image)× FFT(Filter).

Then, the response is computed by taking the inverse fourier transform of the fourier transformed convolved filtered as given by Filtered Image=FFT$^{-1}$[Fourier transform of the filtered Image].

Filter multi-fonts text images of different orientations and scales are tested. The best accuracy are achieved using 8 orientations (0, 22.5, 45, 67.5, 90, 112.5, 135, and 157.5) and 4 scales. The filtered text image was segmented into 9 segments (3×3). This resulted in 8×4×3×3×2=576 features for 8 orienatations, 4 scales, 3×3 segements, using the mean and varience of each segment as features.

A Nearest Neighbor (NN) Classifier using the above mentioned features can be used to discriminate the font of text from a test sample. The Nearest Neighbor (NN) Classifier is a simple classifier that is used to classify the tested images to a matched model (font). The nearest neighbor is computed using an Euclidean distance formula given by:

$$D_i = \sqrt{\sum_{j=1}^{n} (T_{ij} - V_j)^2},$$

where $D_i$ is the distance between the test sample feature vector and the feature vectors of all models, n is the number of features, $T_{ij}$ is the j$^{th}$ feature of the feature vector of model i. $V_j$ is the j$^{th}$ feature of the feature vector of the correct test sample. After calculating the Euclidean distance of the test sample for each font in the model data $T_{ij}$, the font of the test sample is determined to be the font corresponding to the smallest Euclidean distance.

In summary so for, a technique has been presented to recognize Arabic fonts based on a set of extracted features. In this technique, 630 features are extracted and used for Arabic font recognition of which 36 features are classical features that were modified for Arabic fonts recognition, 18 features are implemented from published work, and 576 features are extracted using Log-Gabor features with 8 orientations and 4 scales.

To confirm the validity and test the performance of the Arabic font recognition technique, extensive experiments were conducted to evaluate which features and feature combinations performed best. The experimentation results of Arabic font recognition follow.

Several techniques have been developed over the last years for Arabic and Farsi fonts recognition. These techniques differ in the used features, classifiers, number of fonts, sizes, styles, and datasets.

Several experiments were conducted using APTI and KAFD databases. APTI database consists of 10 fonts, 10 sizes, and 4 styles, whereas KAFD consists of 20 fonts, 10 sizes, and 4 styles.

The best combination of features to use was investigated (viz. Curvature features—Concave and convex features, Direction features, Direction length features, Box Counting Dimension (BCD) features, Center of gravity features, Number of vertical and horizontal extrema features, Number of black and white components features, Smallest black component features, and Log baseline position features). The best combination of features resulted in 97.96% recognition on a dataset of 5 fonts, 2 sizes, and 1000 word samples for testing.

Other experiments used Log-Gabor features. Log-Gabor feature is used with 8 orientations and 4 scales. These were experimentally found to give best results. Using this technique, 98.22% recognition rate is obtained on a dataset of 20 fonts, 10 sizes, 4 styles, using (131,127) line samples for testing.

Other experiments have been conducted to analyze the grouping of similar fonts on the accuracy of font recognition systems. Finally, the proposed technique was compared with all published Arabic/Farsi font recognition techniques.

Two different databases are used in the experiments (viz. APTI and KAFD). APTI database consists of 10 fonts, 10 sizes, and 4 styles. In the experiments 100,000 and 188,838 word samples are used for training and 100,000 and 188,776 word samples are used for testing.

The second database is the KAFD database. This database consists of 20 fonts, 10 sizes, and 4 styles. In the experiment 198,907 line samples are used for training and 131,127 line samples are used for testing.

The features can be divided into two groups. Classical and modified features are set as one group and Log-Gabor features as a second group. Each group is addressed in the following.

In the experiments, Curvature features (Concave and convex features), Direction features, Direction length features, Box Counting Dimension (BCD) features, Center of gravity features, Number of vertical and horizontal extrema features, Number of black and white components features, Smallest black component features, and Log baseline position features are extracted. These features formed a feature vector of 53 features.

Table 13 shows the recognition rates of each feature independently and in groups of two features, three features, four features . . . etc. It shows that the Center of Gravity features have the highest recognition rate of 95.92%, whereas other features like Number of Black and White components features got the lowest recognition rate of 20.41%. In order to obtain the best feature combination, a forward search technique is used. Forward search technique starts by using one feature that has the highest accuracy then gradually add features if this addition improves the accuracy. Based on forward search, the Center of gravity feature is selected first due to its high accuracy. The highest recognition rate using two, three, and four features group is obtained using any feature with Center of Gravity features 95.92%. The best recognition rate of 97.96% is obtained using a combination of all features. Table 13 shows that some features are not suitable for font recognition like Number of vertical extrema, and Number of black and white Components because character may have the same feature value in the different fonts.

TABLE 13

| Feature type | Number of features | Features | Recognition Rate |
|---|---|---|---|
| 1 | 2 | Number of Black and White Components | 20.41% |
| 2 | 10 | Center of Gravity | 95.92% |
| 3 | 1 | Number of vertical extrema | 20.41% |
| 4 | 1 | Smallest black component | 20.41% |
| 5 | 2 | Log baseline and Baseline vertical position | 20.41% |

TABLE 13-continued

| Feature type | Number of features | Features | Recognition Rate |
|---|---|---|---|
| 6 | 8 | Direction (chain code) | 39.18% |
| 7 | 8 | Direction length | 20.41% |
| 8 | 10 | Concave curvature | 59.18% |
| 9 | 10 | Convex curvature | 57.14% |
| 10 | 1 | Box counting dimension | 20.41% |
| 12 | | 1 and 2 | 95.92% |
| 3 | | 1 and 3 | 22.45% |
| 16 | | 6 and 7 | 57.63% |
| 12 | | 2 and 5 | 95.92% |
| 20 | | 8 and 9 | 59.18% |
| 5 | | 1, 3, and 5 | 38.78% |
| 13 | | 2, 3, and 5 | 95.92% |
| 1 | | 11, 3, and 6 | 71.43% |
| 26 | | 6, 7, and 8 | 57.14% |
| 22 | | 5, 8, and 9 | 61.22% |
| 18 | | 5, 6, and 7 | 61.22% |
| 13 | | 1, 2, 3, and 5 | 95.92% |
| 36 | | 6, 7, 8, and 9 | 61.67% |
| 13 | | 1, 3, 5, and 6 | 79.67% |
| 32 | | 2, 5, 8, and 9 | 95.92% |
| 28 | | 2, 5, 6, and 7 | 95.92% |
| 12 | | 3, 5, 4, and 6 | 81.63% |
| 53 | | All Features | 97.96% |

In the experiments 576 Log-Gabor features with 8 orientations and 4 scales were used. This number of orientations and scales are experimentally found to give the highest rates. Each image in this experiment is segmented into 9 segments (3 horizontal and 3 vertical) which resulted in 576 features ((8×4×3×3×2=576) for 8 orientations, 4 scales, 9 segments, and variance and mean features). To evaluate these features, several experiments are conducted using APTI and KAFD databases.

In the experiments, the Log-Gabor features were extracted from the image without segmenting the image into 9 segments. In these experiments 64 Log-Gabor features were used first ((8×4×2=64) for 8 orientations, 4 scales, and variance and mean features).

APTI database consists of 10 fonts, 10 sizes, and 4 styles. In the first experiment, only two font sizes (6 and 24) are used with (188,838) and (188,776) word samples for training and testing, respectively. Using this dataset, a recognition rate of (98.943%) is obtained as shown in Table 14. Based on analyzing the confusion matrix (Table 15), most of the misclassifications are between three fonts DecoType Naskh, DecoType Thuluth, and Diwani Letter.

Based on this confusion matrix, the three similar fonts (DecoType Naskh, DecoType Thuluth, and Diwani Letter) were considered as one class. Using this grouping, a significant improvement of the recognition rate (99.91%) is achieved. Another experiment is conducted to identify the fonts of this class. In this experiment, DecoType Naskh, DecoType Thuluth, and Diwani Letter fonts were experimented with using (56,676) word samples for testing which resulted in 96.78% recognition rate using Nearest neighbor classifier and (96.5559%) using LSSVM classifier. The Nearest neighbor classifier was used for all other experiments.

Table 16 shows the confusion matrix of this experiment. It is noted that from this confusion matrix that most of the misclassifications are between DecoType Naskh and Diwani Letter fonts.

In further experimentations, the number of font sizes was extended to 10 and styles to 4. A dataset of (100,000) and (100,000) samples are used for training and testing, respectively. In this experiment, a recognition rate of (86.91%) is obtained. Based on analyzing the confusion matrix (Table 17), the similarity is between two sets of fonts. The first set consisting of (DecoType Naskh, DecoType Thuluth, and Traditional Arabic) and the second between Simplified Arabic and Arabic Transparent. This similarity between the second set of fonts was also observed by Slimane et al., so he considered them as a single font. Based on that and using the same dataset, another experiment was performed to permit consideration of each set as one class. This results in 7 font classes. In this experiment, (96.29%) recognition rate is obtained. Table 18 shows the confusion matrix of this experiment. In this confusion matrix, Arabic Transparent and Simplified Arabic fonts are grouped into one class (Class-1). Class-2 in this confusion matrix consists of DecoType Naskh, DecoType Thuluth, and Traditional Arabic fonts. In addition, it is evident from this confusion matrix some fonts have a good discrimination like Andalus and Tahoma, whereas other fonts like Diwani Letter got more errors due to the similarity with other fonts. Table 14 shows the recognition rates of the experiments using the APTI database.

In another experiment, 576 Log-Gabor features with 8 orientations and 4 scales were used. Each image in this experiment is segmented into 9 segments (3 horizontal and 3 vertical) which resulted in 576 features ((8×4×3×3×2=576) for 8 orientations, 4 scales, 9 segments, and variance and mean features). In this experiment 10 fonts, two fonts sizes (6 and 24), and one style with (188,838) and (188,776) word samples were used for training and testing, respectively. In this experiment a recognition rate of (99.85%) is obtained without grouping similar fonts as shown in Table 14. The confusion matrix of this experiment is shown in Table 19.

TABLE 14

| Experiment No | Number of features | Number of font classes | Size | Style | Recognition rate | Grouped fonts |
|---|---|---|---|---|---|---|
| 1 | 64 | 10 | 6, 24 | Normal | 98.94% | — |
| 2 | 64 | 3 | 6, 24 | Normal | 96.78% | — |
| 3 | 64 | 10 | 6, 24 | Normal | 99.91% | DecotypeNaskh DecotypeThulth Diwani Letter |
| 4 | 64 | 10 | 6-7-8-9-10-12-14-16-18-24 | Normal, Bold, Italic, Bold Italic | 86.91% | — |
| 5 | 64 | 7 | 6-7-8-9-10-12-14-16-18-24 | Normal, Bold, Italic, Bold Italic | 96.29% | — |
| 6 | 576 | 10 | 6, 24 | Normal | 99.85% | — |

| S.N | Font | Arabic Transparent | Andalus | Advertising Bold | DiWani Letter | Deco Type Thuluth | Tahoma | Traditional Arabic | Traditional Arabic | Deco Tpe Naskh | M Unicode Sara | Recognition Rate |
|---|---|---|---|---|---|---|---|---|---|---|---|---|
| 1 | Arabic Transparent | 18852 | 13 | 0 | 0 | 0 | 0 | 2 | 1 | 0 | 0 | 99.915% |
| 2 | Andalus | 1 | 18867 | 0 | 0 | 0 | 0 | 0 | 0 | 0 | 0 | 99.995% |
| 3 | Advertising Bold | 0 | 0 | 18866 | 0 | 0 | 0 | 2 | 0 | 0 | 0 | 99.989% |
| 4 | Diwani Letter | 0 | 0 | 0 | 18503 | 144 | 0 | 0 | 0 | 245 | 0 | 97.941% |
| 5 | DecoType Thuluth | 0 | 0 | 0 | 119 | 18588 | 0 | 0 | 0 | 185 | 0 | 98.391% |
| 6 | Simplified Arabic | 0 | 0 | 0 | 4 | 0 | 18763 | 0 | 0 | 21 | 80 | 99.444% |
| 7 | Tahoma | 1 | 0 | 0 | 0 | 0 | 0 | 18867 | 0 | 0 | 0 | 99.995% |
| 8 | Traditional Arabic | 0 | 0 | 0 | 0 | 0 | 0 | 0 | 18868 | 0 | 0 | 100% |
| 9 | DecoType Naskh | 0 | 0 | 0 | 705 | 428 | 1 | 0 | 0 | 17740 | 18 | 93.902% |
| 10 | M Unicode Sara | 0 | 0 | 0 | 1 | 0 | 5 | 0 | 0 | 20 | 18866 | 99.862% |
| | Average | | | | | | | | | | | 98.943% |

TABLE 16

| S.N | Font | Diwani Letter | DecoType Thuluth | DecoType Naskh | Recognition rate |
|---|---|---|---|---|---|
| 1 | Diwani Letter | 18504 | 143 | 245 | 97.95% |
| 2 | DecoType Thuluth | 119 | 18588 | 185 | 98.39% |
| 3 | DecoType Naskh | 707 | 428 | 17757 | 93.99% |
| | Average | | | | 96.78% |

TABLE 17

| S.N | Font | Arabic Transparent | Andalus | Advertising Bold | Diwani Letter | Deco Type Thuluth | Simplified Arabic | Tahoma | Traditional Arabic | Deco Type Naskh | M Unicode Sara | Recognition rate |
|---|---|---|---|---|---|---|---|---|---|---|---|---|
| 1 | Arabic Transparent | 6519 | 27 | 23 | 16 | 18 | 2933 | 63 | 304 | 75 | 22 | 65.19% |
| 2 | Andalus | 17 | 9888 | 6 | 1 | 3 | 17 | 19 | 7 | 7 | 35 | 98.88% |
| 3 | Advertising Bold | 20 | 0 | 9773 | 0 | 0 | 16 | 87 | 4 | 2 | 98 | 97.73% |
| 4 | Diwani Letter | 56 | 17 | 0 | 9587 | 83 | 29 | 6 | 129 | 68 | 25 | 95.87% |
| 5 | DecoType Thuluth | 16 | 36 | 0 | 45 | 9538 | 18 | 2 | 300 | 44 | 1 | 95.38% |
| 6 | Simplified Arabic | 4782 | 45 | 21 | 15 | 38 | 4620 | 53 | 353 | 57 | 16 | 46.2% |
| 7 | Tahoma | 23 | 14 | 34 | 2 | 3 | 16 | 9831 | 26 | 5 | 46 | 98.31% |
| 8 | Traditional Arabic | 248 | 8 | 5 | 63 | 294 | 180 | 49 | 8957 | 181 | 15 | 89.57% |
| 9 | DecoType Naskh | 211 | 35 | 11 | 141 | 273 | 158 | 56 | 567 | 8521 | 27 | 85.21% |
| 10 | M Unicode Sara | 25 | 66 | 71 | 8 | 1 | 25 | 93 | 16 | 12 | 9683 | 96.83% |
| | Average | | | | | | | | | | | 86.917% |

TABLE 18

| S.N | Font | Class-1 | Andalus | Advertising Bold | Diwani Letter | Class-2 | Tahoma | M Unicode Sara | Recognition rate |
|---|---|---|---|---|---|---|---|---|---|
| 1 | Group-1 (Arabic Transparent and Simplified Arabic) | 18854 | 72 | 44 | 31 | 845 | 116 | 38 | 94.27% |
| 2 | Andalus | 34 | 9888 | 6 | 1 | 17 | 19 | 35 | 98.88% |
| 3 | Advertising Bold | 36 | 0 | 9773 | 0 | 6 | 87 | 98 | 97.73% |
| 4 | Diwani Letter | 85 | 17 | 0 | 9587 | 280 | 6 | 25 | 95.87% |
| 5 | Group-2 (DecoType Thuluth, DecoType Naskh, and Traditional Arabic) | 831 | 79 | 16 | 249 | 28675 | 107 | 43 | 95.58% |
| 6 | Tahoma | 39 | 14 | 34 | 2 | 34 | 9831 | 46 | 98.31% |
| 7 | M Unicode Sara | 50 | 66 | 71 | 8 | 29 | 93 | 9683 | 96.83% |
| | Average | | | | | | | | 96.291% |

TABLE 19

| S.N | Font | Arabic Transparent | Andalus | Advertising Bold | Diwani Letter | Deco Type Thuluth | Simplified Arabic | Tahoma | Traditional Arabic | Deco Type Naskh | M Unicode Sara | Recognition rate |
|---|---|---|---|---|---|---|---|---|---|---|---|---|
| 1 | Arabic Transparent | 18840 | 1 | 3 | 0 | 0 | 0 | 3 | 21 | 0 | 0 | 99.85% |
| 2 | Andalus | 2 | 18865 | 1 | 0 | 0 | 0 | 0 | 0 | 0 | 0 | 99.98% |
| 3 | Advertising Bold | 1 | 0 | 18863 | 0 | 0 | 0 | 4 | 0 | 0 | 0 | 99.97% |
| 4 | Diwani Letter | 0 | 0 | 0 | 18880 | 6 | 0 | 0 | 0 | 5 | 1 | 99.94% |
| 5 | DecoType Thuluth | 0 | 0 | 0 | 4 | 18868 | 0 | 0 | 0 | 20 | 0 | 99.87% |
| 6 | Simplified Arabic | 0 | 0 | 0 | 4 | 2 | 18847 | 0 | 0 | 7 | 8 | 99.89% |
| 7 | Tahoma | 0 | 0 | 0 | 0 | 0 | 0 | 18867 | 1 | 0 | 0 | 99.99% |
| 8 | Traditional Arabic | 4 | 1 | 0 | 0 | 0 | 0 | 2 | 18861 | 0 | 0 | 99.96% |
| 9 | DecoType Naskh | 0 | 0 | 0 | 31 | 143 | 0 | 0 | 0 | 18704 | 14 | 99% |
| 10 | M Unicode Sara | 0 | 0 | 0 | 0 | 0 | 0 | 0 | 0 | 1 | 18891 | 99.99% |
| | Average | | | | | | | | | | | 99.85% |

The KAFD database consists of 20 fonts, 10 sizes, and 4 styles. It is available in two forms (page and line). In the experiments using this database, initiation was with 10 fonts (viz. Courier New, DecoType Naskh, M Unicode sara, Segore UI, Freehand, Kaleelah Regular, Arabswell, Diwani Letter, Al-Qairwan, and Al Mohand), with size of 8, and Normal style. A dataset of (2651) and (852) line samples are used for training and testing, respectively. Using this dataset, a recognition rate of 99.061% is obtained as shown in Table 20. The error rate is (0.939%). This may be attributed to the uniqueness of those fonts. In other experiments, 10 more fonts were added (viz. Times New Roman, Arial, Arial Unicode, Arabic Transparent, Simplified Arabic, Arabic Typesetting, Traditional Arabic, Microsoft Uighur, Motken Unicode, and Tahoma). Using a dataset of 20 fonts, 10 sizes, 4 styles, 198,907 line images for training, and 131,127 line images for testing, a recognition rate of (89.59%) was obtained. After performing the confusion matrix analysis (Table 21), it is noted that the misclassifications are mainly between the following fonts:

Arial, Times New Roman, Simplified Arabic, and Arabic Transparent

Arabic Typesetting, Traditional Arabic, and DecoType Naskh

Tahoma and Arial Unicode

As shown in FIG. 26, these fonts cannot be easily distinguished by humans.

TABLE 20

| Number of font classes | Size | Style | Recognition rate |
|---|---|---|---|
| 10 | 8 | Normal | 99.061% |
| 20 | 8, 9, 10, 11, 12, 14, 16, 18, 20, 24 | Normal, Bold, Italic, Bold Italic | 89.59% |
| 14 | 8, 9, 10, 11, 12, 14, 16, 18, 20, 24 | Normal, Bold, Italic, Bold Italic | 98.2% |

TABLE 21

| Font | Courier New | Deco Type Naskh | M Unicode Sara | Segore UI | Traditional Arabic | AGA Kaleelah Regular | Arial Unicode MS | Diwani Letter | Times New Roman | Al-Mohand |
|---|---|---|---|---|---|---|---|---|---|---|
| Courier New | 7856 | 0 | 1 | 8 | 7 | 0 | 0 | 0 | 0 | 0 |
| Deco Type Naskh | 0 | 4465 | 0 | 1 | 2 | 1 | 0 | 1 | 6 | 2 |
| M Unicode Sara | 0 | 0 | 6318 | 0 | 0 | 1 | 0 | 0 | 0 | 3 |
| Segore UI | 10 | 0 | 2 | 6219 | 2 | 0 | 108 | 1 | 208 | 15 |
| Traditional Arabic | 5 | 11 | 5 | 35 | 5464 | 0 | 0 | 0 | 6 | 25 |
| AGA Kaleelah Regular | 0 | 0 | 1 | 0 | 0 | 4968 | 0 | 0 | 0 | 0 |
| Arial Unicode MS | 3 | 4 | 1 | 9 | 0 | 0 | 7278 | 1 | 0 | 3 |
| Diwani Letter | 1 | 0 | 0 | 1 | 0 | 1 | 0 | 4591 | 0 | 15 |
| Times New Roman | 0 | 0 | 2 | 42 | 3 | 0 | 3 | 0 | 4152 | 10 |
| Al-Mohand | 10 | 24 | 3 | 5 | 4 | 19 | 5 | 0 | 9 | 6314 |
| AL-Qairwan | 0 | 0 | 0 | 0 | 0 | 0 | 0 | 0 | 0 | 2 |
| Arabic Typesetting | 1 | 71 | 6 | 22 | 107 | 1 | 5 | 0 | 20 | 5 |
| Arabswell | 0 | 0 | 8 | 6 | 8 | 2 | 0 | 0 | 3 | 41 |
| Arial | 1 | 8 | 0 | 58 | 3 | 0 | 3 | 0 | 2550 | 40 |
| Microsoft Uighur | 20 | 3 | 0 | 0 | 5 | 0 | 59 | 5 | 26 | 28 |
| Motken Unicode Ho | 1 | 3 | 7 | 3 | 4 | 11 | 1 | 0 | 0 | 0 |
| Simplified Arabic | 5 | 0 | 5 | 29 | 1 | 0 | 28 | 0 | 1429 | 30 |
| Freehand | 0 | 0 | 0 | 1 | 0 | 10 | 14 | 0 | 0 | 0 |
| Tahoma | 1 | 0 | 1 | 15 | 0 | 0 | 255 | 1 | 0 | 0 |
| Arabic Transparent | 0 | 0 | 0 | 1 | 4 | 0 | 0 | 0 | 465 | 25 |

| Font | Arabic Typesetting | Arabswell | Arial | Microsoft Uighur | Motken Unicode Ho | Simplified Arabic | Freehand | Tahoma | Arabic Transparent | Recognition rate |
|---|---|---|---|---|---|---|---|---|---|---|
| Courier New | 3 | 0 | 0 | 0 | 1 | 0 | 0 | 0 | 0 | 99.75% |
| Deco Type Naskh | 129 | 2 | 5 | 63 | 2 | 3 | 1 | 0 | 7 | 95.20% |
| M Unicode Sara | 0 | 0 | 0 | 0 | 1 | 0 | 0 | 1 | 0 | 99.91% |
| Segore UI | 0 | 3 | 130 | 5 | 0 | 20 | 0 | 33 | 43 | 91.47% |
| Traditional Arabic | 108 | 8 | 8 | 63 | 1 | 5 | 0 | 0 | 24 | 94.73% |
| AGA Kaleelah Regular | 2 | 0 | 0 | 0 | 0 | 0 | 0 | 4 | 1 | 99.84% |
| Arial Unicode MS | 0 | 0 | 1 | 25 | 1 | 0 | 0 | 130 | 3 | 97.56% |
| Diwani Letter | 0 | 0 | 0 | 0 | 2 | 0 | 0 | 0 | 0 | 99.57% |
| Times New Roman | 9 | 0 | 1960 | 4 | 1 | 769 | 0 | 1 | 311 | 57.13% |
| Al-Mohand | 0 | 7 | 23 | 32 | 0 | 18 | 0 | 12 | 58 | 96.50% |
| AL-Qairwan | 8 | 0 | 0 | 8 | 0 | 2 | 4 | 1 | 8 | 99.46% |
| Arabic Typesetting | 7153 | 3 | 12 | 65 | 7 | 12 | 0 | 2 | 16 | 95.27% |
| Arabswell | 1 | 5046 | 2 | 2 | 10 | 0 | 0 | 0 | 4 | 98.31% |
| Arial | 3 | 3 | 3645 | 0 | 0 | 695 | 0 | 1 | 316 | 49.75% |
| Microsoft Uighur | 78 | 0 | 15 | 8515 | 0 | 18 | 0 | 0 | 54 | 96.48% |
| Motken Unicode Ho | 1 | 4 | 2 | 1 | 6074 | 0 | 5 | 1 | 0 | 99.28% |
| Simplified Arabic | 5 | 2 | 868 | 17 | 8 | 2397 | 0 | 12 | 713 | 43.20% |
| Freehand | 0 | 0 | 1 | 1 | 1 | 0 | 6188 | 12 | 1 | 99.33% |
| Tahoma | 0 | 6 | 1 | 22 | 0 | 2 | 1 | 7348 | 2 | 95.99% |
| Arabic Transparent | 0 | 0 | 429 | 31 | 0 | 458 | 1 | 0 | 6990 | 83.17% |

Based on the confusion matrix (Table 21), similar fonts are grouped into three font classes. The first class composes of Arial, Times New Roman, Simplified Arabic, and Arabic Transparent fonts; the second class consists of Arabic Typesetting, Traditional Arabic, and DecoType Naskh fonts; and third class consists of Tahoma and Arial Unicode fonts. Using these grouping, a set of experiments were performed on 14 font classes (20 fonts), with 10 sizes, and 4 styles. In this experiment a significant improvement in the recognition rate is achieved, leading to a recognition rate of 98.22%. Table 22 shows the confusion matrix of this experiment with grouping similar fonts. It is noted from this confusion matrix that some fonts like M Unicode Sara and Diwani letter have high recognition rates, whereas other fonts like Al-Mohand and Microsoft Uighur have lower recognition rates due to the similarity to group-1 fonts. Table 20 shows the recognition rates of the experiments using KAFD.

This approach is compared with the published work on the number of fonts, sizes, styles, dataset size, and accuracy as shown in Table 23. Table 23 shows the evaluation attributes for each technique. Other researchers used only one font size and style, and limited dataset. In contrast, this approach used 20 fonts, 10 sizes, and 4 styles. The present results, although using the same database, cannot be accurately compared with F. Slimane, S. Kanoun, A. M. Alimi, R. Ingold, and J. Hennebert, "Gaussian Mixture Models for Arabic Font Recognition," 2010 20*th International Conference on Pattern Recognition*, pp. 2174-2177, August 2010., as the used training and testing samples may not be the same. The database has 45,313,600 million images and researchers select their training and testing sets which normally much less than the database. Slimane et al. selected 100,000 word images for training and 100,000 word images for testing and (100,000) and (188,838) word images were used for training and (100,000) and (188,776) word images were used for testing.

To review so far, experimental results of Arabic font recognition have been presented. Several features were used for font recognition (viz. Curvature features (Concave and convex features), Direction features, Direction length features, Box Counting Dimension (BCD) features, Center of gravity features, Number of vertical and horizontal extrema features, Number of black and white components features, Smallest black component features, Log baseline position feature, and Log-Gabor features).

Nearest Neighbor classifier is used with the Euclidian distance measure. Two databases are used in the experiments APTI and KAFD. A set of 20 fonts, 10 sizes, 4 styles, consisting of (330,034) line samples of KAFD database are used for analysis and experimentations.

TABLE 22

| Font | Courier New | M Unicode Sara | Segore UI | AGA Kaleelah Regular | Group-3 | Diwani Letter | Al-Mohand | Al-Qairwan |
|---|---|---|---|---|---|---|---|---|
| Courier New | 7856 | 1 | 8 | 0 | 0 | 0 | 0 | 0 |
| M Unicode Sara | 0 | 6318 | 0 | 1 | 1 | 0 | 3 | 0 |
| Segore UI | 10 | 2 | 6219 | 0 | 141 | 1 | 15 | 0 |
| AGA Kaleelah Regular | 0 | 1 | 0 | 4968 | 4 | 0 | 0 | 0 |
| Group-3 | 4 | 2 | 24 | 0 | 15011 | 2 | 3 | 1 |
| Diwani Letter | 1 | 0 | 1 | 1 | 0 | 4591 | 15 | 0 |
| Al-Mohand | 10 | 3 | 5 | 19 | 17 | 0 | 6314 | 0 |
| Al-Qairwan | 0 | 0 | 0 | 0 | 1 | 0 | 2 | 6030 |
| Group-2 | 6 | 11 | 58 | 2 | 7 | 1 | 32 | 0 |
| Arabswell | 0 | 8 | 6 | 2 | 0 | 0 | 41 | 0 |
| Group-1 | 6 | 7 | 130 | 0 | 48 | 0 | 105 | 1 |
| Microsoft Uighur | 20 | 0 | 0 | 0 | 59 | 5 | 28 | 0 |
| Motken Unicode Ho | 1 | 7 | 3 | 11 | 2 | 0 | 0 | 0 |
| Freehand | 0 | 0 | 1 | 10 | 26 | 0 | 0 | 1 |

| Font | Group-2 | Arabswell | Group-1 | Microsoft Uighur | Motken Unicode Ho | Freehand | Recognition rate |
|---|---|---|---|---|---|---|---|
| Courier New | 10 | 0 | 0 | 0 | 1 | 0 | 99.27% |
| M Unicode Sara | 0 | 0 | 0 | 0 | 1 | 0 | 99.91% |
| Segore UI | 2 | 3 | 401 | 5 | 0 | 0 | 91.47% |
| AGA Kaleelah Regular | 2 | 0 | 1 | 0 | 0 | 0 | 99.84% |
| Group-3 | 4 | 6 | 9 | 47 | 1 | 1 | 99.31% |
| Diwani Letter | 0 | 0 | 0 | 0 | 2 | 0 | 99.57% |
| Al-Mohand | 28 | 7 | 108 | 32 | 0 | 0 | 96.50% |
| Al-Qairwan | 8 | 0 | 10 | 8 | 0 | 4 | 99.46% |
| Group-2 | 17510 | 13 | 124 | 191 | 10 | 1 | 97.46% |
| Arabswell | 9 | 5046 | 9 | 2 | 10 | 0 | 98.31% |
| Group-1 | 36 | 5 | 28147 | 52 | 9 | 1 | 98.60% |
| Microsoft Uighur | 86 | 0 | 113 | 8515 | 0 | 0 | 96.48% |
| Motken Unicode Ho | 8 | 4 | 2 | 1 | 6074 | 5 | 99.28% |
| Freehand | 0 | 0 | 2 | 1 | 1 | 6188 | 99.33% |

TABLE 23

| Authors | Fonts | sizes | styles | Database name | Database level | Training dataset | Testing dataset | Accuracy |
|---|---|---|---|---|---|---|---|---|
| Bataineh et al. | 7 | — | — | Authors data | Block | 700 | 700 | 97.85% |
| Zahedi et al. | 20 | — | — | Khosravi and Kabir | Paragraph | 20 | 75 | 100% |
| Bataineh et al. | 7 | — | — | Authors data | Block | 700 | 700 | 98.008% |
| Slimane et al. | 10 | 10 | 4 | APTI | Word | 100,000 | 100,000 | 99.1% |
| Ben Moussa et al. | 10 | — | — | ALPH-REGIM | Paragraph | 500 | 500 | 99.66% |
| Our approach (Log-Gabor)-64 features | 10 | 10 | 4 | APTI | Word | 100,000 | 100,000 | 96.3% |
| Our approach (Log-Gabor)-576 features | 10 | 2 | 1 | APTI | Word | 188,838 | 188,776 | 99.85% |
| Our approach (Log-Gabor)- 576 features | 20 | 10 | 4 | KAFD | Line | 198,907 | 131,127 | 98.2% |

Several experiments were conducted to evaluate the extracted features. In addition using features combination resulted in 97.96% recognition rate for the best combination using five fonts, two sizes, and 1000 word images for testing. Other experiments were conducted to evaluate Log-Gabor features using APTI and KAFD databases. In these experiments, Log-Gabor is used with 8 orientations and 4 scales. In the experiments using APTI database, 64 and 576 Log-Gabor features were used. In the experiments using 64 Log-Gabor features with APTI database, a recognition rate of 98.94% is obtained in a dataset consists of 10 fonts, two sizes, one style and 188,776 word samples for testing. The error is resulted from the similarity between DecoType Naskh, DecoType Thuluth, and Diwani Letter fonts. Grouping these similar fonts into a single class improved the recognition rate to 99.9%. Then, these experiments were extended by adding all sizes and styles of APTI database. In these experiments 86.917% recognition rate is obtained. The error in these experiments is resulted due to the similarity between some fonts. Grouping similar fonts improved the recognition rate to 96.3%. In other experiments a recognition rate of (99.85%) is obtained using 576 Log-Gabor features with 10 fonts, 2 sizes, one style, and (188,776) word samples of APTI database.

Other experiments were conducted using KAFD database. In these experiments a recognition rate of 99.06% with 10 fonts, size 8, and Normal style was obtained. Adding 10 more fonts resulted in 89.59% recognition rate in a dataset consists of 10 sizes, 4 styles, and 131,127 line samples for testing. The error is resulted of the similarity between some fonts. Grouping similar fonts improved the recognition rate to 98.2% on a dataset consists of 20 fonts, 10 sizes, 4 styles and 131,127 line samples for testing.

The method of Arabic font recognition can be implemented using computational hardware.

Figure 27:
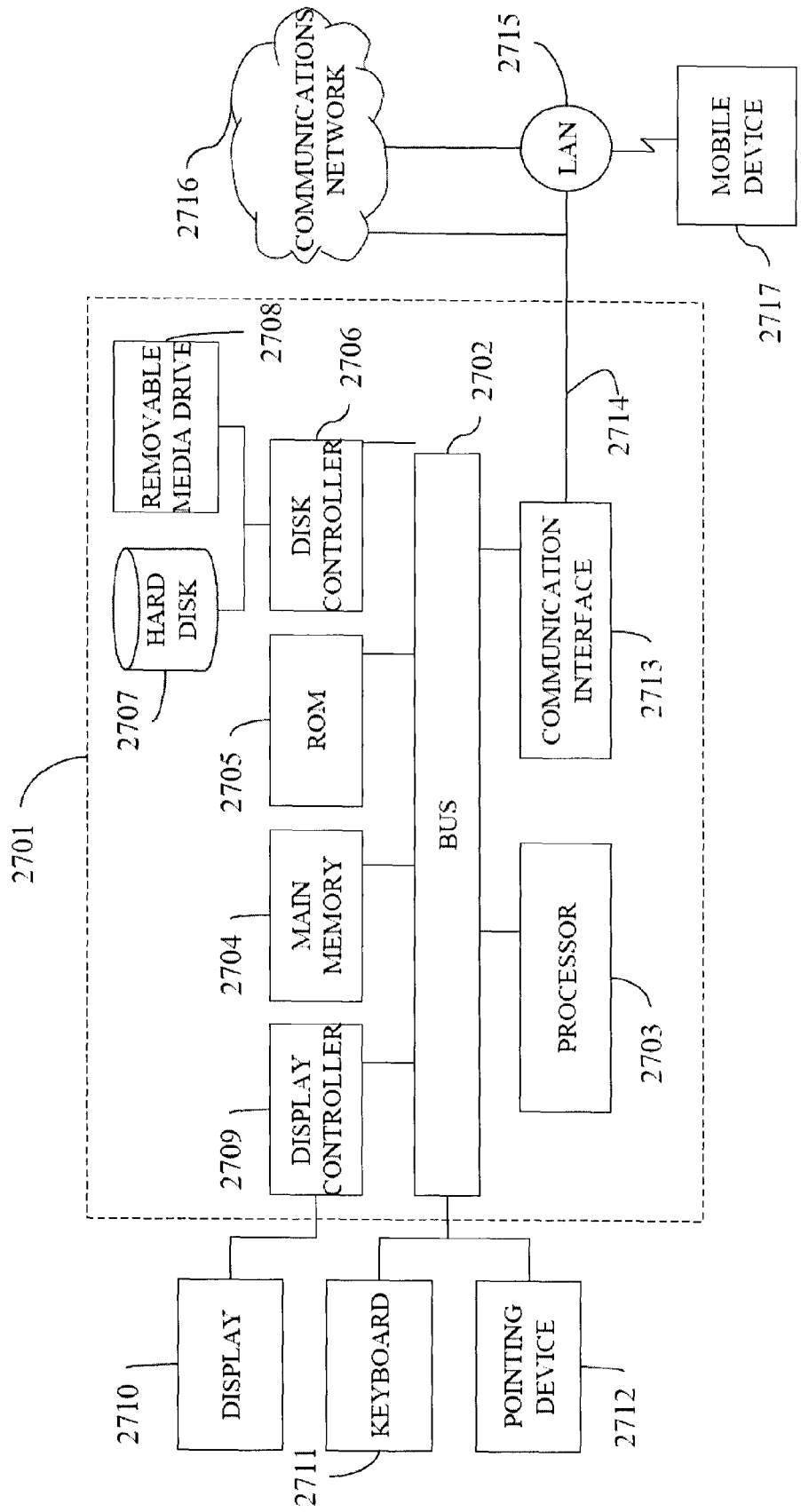
FIG. 27 shows a schematic of a device implementing the method of Arabic font recognition.

Next, a hardware description of the device according to exemplary embodiments is described with reference to FIG. 27. In FIG. 27, the device includes a CPU 2700 which performs the processes described above. The process data and instructions may be stored in memory 2702. These processes and instructions may also be stored on a storage medium disk 2704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

Further, the claimed advancements may be provided as a utility application, background daemon, or component of an operating system, or combination thereof, executing in conjunction with CPU 2700 and an operating system such as Microsoft Windows 7, UNIX, Solaris, LINUX, Apple MAC-OS and other systems known to those skilled in the art.

CPU 2700 may be a Xenon or Core processor from Intel of America or an Opteron processor from AMD of America, or may be other processor types that would be recognized by one of ordinary skill in the art. Alternatively, the CPU 2700 may be implemented on an FPGA, ASIC, PLD or using discrete logic circuits, as one of ordinary skill in the art would recognize. Further, CPU 2700 may be implemented as multiple processors cooperatively working in parallel to perform the instructions of the inventive processes described above.

The device in FIG. 27 also includes a network controller 2706, such as an Intel Ethernet PRO network interface card from Intel Corporation of America, for interfacing with a network. As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G and 4G wireless cellular systems. The wireless network can also be WiFi, Bluetooth, or any other wireless form of communication that is known.

The device further includes a display controller 2708, such as a NVIDIA GeForce GTX or Quadro graphics adaptor from NVIDIA Corporation of America for interfacing with display 2710, such as a Hewlett Packard HPL2445w LCD monitor. A general purpose I/O interface 2712 interfaces with a keyboard and/or mouse 2714 as well as a touch screen panel 2716 on or separate from display 2710. General purpose I/O interface also connects to a variety of peripherals 2718 including printers and scanners, such as an OfficeJet or DeskJet from Hewlett Packard.

A sound controller 2720 is also provided in the device, such as Sound Blaster X-Fi Titanium from Creative, to interface with speakers/microphone 2722 thereby providing sounds and/or music.

The general purpose storage controller 2724 connects the storage medium disk 2704 with communication bus 2726, which may be an ISA, EISA, VESA, PCI, or similar, for interconnecting all of the components of the device. A description of the general features and functionality of the display 2710, keyboard and/or mouse 2714, as well as the display controller 2708, storage controller 2724, network controller 2706, sound controller 2720, and general purpose I/O interface 2712 is omitted herein for brevity as these features are known.

Hamzah Abdullah Luqman, "ARABIC FONT RECOGNITION" Masters' Thesis in Information and Computer Science, King Fahd University of Petroleum and Minerals, Dhahran, Saudi Arabia (May 2013) is incorporated herein by reference in its entirety.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of font recognition comprising:
calculating a plurality of feature values for a sample text, wherein the feature values correspond to a plurality of font features, and the plurality of font features includes curvature features for the sample text;
determining a Euclidian distance between the plurality of the feature values for the sample text and respective model feature values for each of a plurality of predefined fonts, wherein the Euclidian distance for the $i^{th}$ predefined font is given by $$D_i = \sqrt{\sum_{j=1}^{n} (T_{ij} - V_j)^2},$$

where n is the number of feature values, $T_{ij}$ is an element corresponding to the $i^{th}$ row and $j^{th}$ column of a matrix of the model values, and $V_j$ is a $j^{th}$ element a vector containing the plurality of the feature values for the sample text; and
signaling that the font of the sample text is the font from the plurality of predefined fonts corresponding to the smallest Euclidian distance.

2. The method according to claim 1, wherein
the plurality of font features includes the center of gravity features of the sample text.

3. The method according to claim 2, wherein
the plurality of font features includes log baseline features, baseline vertical position features, number of vertical extrema features, a number of black components, and a number of white components.

4. The method according to claim 3, wherein
the plurality of font features includes chain code direction features.

5. The method according to claim 3, wherein
the plurality of font features includes chain code direction features and direction length features.

6. The method according to claim 3, wherein the plurality of font features includes concave curvature features and convex curvature features.

7. The method according to claim 6, wherein the plurality of font features includes chain code direction features, direction length features, and a smallest black component.

8. The method according to claim 6, further comprising: preprocessing the sample text before calculating the plurality of feature values for the sample text, wherein the preprocessing includes normalizing the height and width of the sample text.

9. The method according to claim 1, wherein the plurality of font features includes chain code direction features.

10. The method according to claim 9, wherein the plurality of font features includes direction length features.

11. The method according to claim 1, wherein the curvature features include concave curvature features and convex curvature features.

12. A method of font recognition comprising:
calculating a plurality of feature values for a sample text, wherein the feature values correspond to a plurality of font features, and the plurality of font features includes Log-Gabor orientation-scale-variance features and Log-Gabor orientation-scale-mean features for the sample text;
determining a Euclidian distance between the plurality of the feature values for the sample text and respective model feature values for each of a plurality of predefined fonts, wherein the Euclidian distance for the $i^{th}$ predefined font is given by $$D_i = \sqrt{\sum_{j=1}^{n} (T_{ij} - V_j)^2},$$

where n is the number of feature values, $T_{ij}$ is an element corresponding to the $i^{th}$ row and $j^{th}$ column of a matrix of the model values, and $V_j$ is a $j^{th}$ element a vector containing the plurality of the feature values for the sample text; and
signaling that the font of the sample text is the font from the plurality of predefined fonts corresponding to the smallest Euclidian distance.

13. The method according to claim 12, wherein
the sample text is subdivided into nine segments on a three by three grid; and
the Log-Gabor orientation-scale-variance features and the Log-Gabor orientation-scale-mean features are calculated for each segment of the three by three grid.

14. The method according to claim 12, further comprising: preprocessing the sample text before calculating the plurality of feature values for the sample text, wherein the preprocessing includes normalizing the height and width of the sample text.

15. An apparatus for font recognition, the apparatus comprising:
circuitry configured to calculate a plurality of feature values for a sample text, wherein the feature values correspond to a plurality of font features, and the plurality of font features includes Log-Gabor orientation-scale-variance features and Log-Gabor orientation-scale-mean features for the sample text;
circuitry configured to calculate a Euclidian distance between the plurality of the feature values for the sample text and respective model feature values for each of a plurality of predefined fonts, wherein the Euclidian distance for the $i^{th}$ predefined font is given by $$D_i = \sqrt{\sum_{j=1}^{n} (T_{ij} - V_j)^2},$$

where n is the number of feature values, $T_{ij}$ is an element corresponding to the $i^{th}$ row and $j^{th}$ column of a matrix of the model values, and $V_j$ is a $j^{th}$ element a vector containing the plurality of the feature values for the sample text; and
circuitry configured to determine the smallest Euclidian distance, and to signal that the font of the sample text is the font from the plurality of predefined fonts corresponding to the smallest Euclidian distance.

* * * * *